(12) United States Patent
Janoski et al.

(10) Patent No.: US 11,167,523 B2
(45) Date of Patent: Nov. 9, 2021

(54) ACRYLIC FILMS COMPRISING A STRUCTURED LAYER

(71) Applicant: 3M INNOVATIVE PROPERTIES COMPANY, St. Paul, MN (US)

(72) Inventors: Jonathan E. Janoski, Woodbury, MN (US); Carla S. Thomas, Woodbury, MN (US); Anthony F. Schultz, Forest Lake, MN (US); Tien Y. H. Whiting, St. Paul, MN (US); Kevin M. Lewandowski, Inver Grove Heights, MN (US); Duane D. Fansler, Dresser, WI (US); Keith R. Lyon, Hudson, WI (US); Arlin L. Weikel, Mansfield, PA (US); Evan D. Brutinel, Inver Grove Heights, MN (US); Michael W. Kobe, Lake Elmo, MN (US); Taylor J. Kobe, Woodbury, MN (US); Ronald S. Steelman, Woodbury, MN (US); Eric D. Shockey, Stillwater, MN (US); John W. Frank, Cottage Grove, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/777,312

(22) PCT Filed: Dec. 14, 2016

(86) PCT No.: PCT/US2016/066453
§ 371 (c)(1),
(2) Date: May 18, 2018

(87) PCT Pub. No.: WO2017/112468
PCT Pub. Date: Jun. 29, 2017

(65) Prior Publication Data
US 2018/0304576 A1 Oct. 25, 2018

Related U.S. Application Data

(60) Provisional application No. 62/346,760, filed on Jun. 7, 2016, provisional application No. 62/270,746, filed on Dec. 22, 2015.

(51) Int. Cl.
*B32B 3/30* (2006.01)
*B32B 27/08* (2006.01)
(Continued)

(52) U.S. Cl.
CPC ............... *B32B 3/30* (2013.01); *B32B 5/022* (2013.01); *B32B 5/024* (2013.01); *B32B 15/082* (2013.01);
(Continued)

(58) Field of Classification Search
CPC ...................................................... B32B 3/30
See application file for complete search history.

(56) References Cited

U.S. PATENT DOCUMENTS

| 2,736,721 A | 2/1956 | Dexter |
| RE24,906 E | 12/1960 | Ulrich |

(Continued)

FOREIGN PATENT DOCUMENTS

| CN | 1575099 | 2/2005 |
| CN | 101817975 | 9/2010 |

(Continued)

OTHER PUBLICATIONS

Chen et al., "Miscibility and phase behavior in blends of poly(vinyl butyral) and poly(methyl methacrylate," Macromolecules, vol. 34, 4277-4284, published 2001 (Year: 2001).*

(Continued)

*Primary Examiner* — Callie E Shosho
*Assistant Examiner* — John Vincent Lawler
(74) *Attorney, Agent, or Firm* — Carolyn A. Fischer

(57) ABSTRACT

A film is described comprising a (meth)acrylic polymer and polyvinyl acetal polymer composition, wherein the film comprises a structured layer.

20 Claims, 6 Drawing Sheets

(51) Int. Cl.

| | | |
|---|---|---|
| *B32B 27/26* | (2006.01) | |
| *B32B 27/30* | (2006.01) | |
| *B32B 27/20* | (2006.01) | |
| *B32B 27/32* | (2006.01) | |
| *B32B 27/10* | (2006.01) | |
| *B32B 27/36* | (2006.01) | |
| *C08J 5/08* | (2006.01) | |
| *B32B 27/12* | (2006.01) | |
| *B32B 27/06* | (2006.01) | |
| *B32B 15/082* | (2006.01) | |
| *B32B 27/18* | (2006.01) | |
| *B32B 5/02* | (2006.01) | |
| *B32B 27/40* | (2006.01) | |
| *B32B 27/34* | (2006.01) | |
| *B32B 27/28* | (2006.01) | |
| *B32B 29/00* | (2006.01) | |
| *C08J 5/18* | (2006.01) | |
| *D06N 3/04* | (2006.01) | |

(52) U.S. Cl.
CPC ............ *B32B 27/065* (2013.01); *B32B 27/08* (2013.01); *B32B 27/10* (2013.01); *B32B 27/12* (2013.01); *B32B 27/18* (2013.01); *B32B 27/20* (2013.01); *B32B 27/26* (2013.01); *B32B 27/281* (2013.01); *B32B 27/30* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 29/002* (2013.01); *C08J 5/08* (2013.01); *C08J 5/18* (2013.01); *B32B 2250/02* (2013.01); *B32B 2255/02* (2013.01); *B32B 2255/06* (2013.01); *B32B 2255/10* (2013.01); *B32B 2255/12* (2013.01); *B32B 2255/205* (2013.01); *B32B 2255/26* (2013.01); *B32B 2262/0253* (2013.01); *B32B 2262/0261* (2013.01); *B32B 2262/04* (2013.01); *B32B 2262/062* (2013.01); *B32B 2262/101* (2013.01); *B32B 2262/105* (2013.01); *B32B 2264/102* (2013.01); *B32B 2307/31* (2013.01); *B32B 2307/408* (2013.01); *B32B 2307/4026* (2013.01); *B32B 2307/41* (2013.01); *B32B 2307/412* (2013.01); *B32B 2307/418* (2013.01); *B32B 2307/54* (2013.01); *B32B 2307/546* (2013.01); *B32B 2307/718* (2013.01); *B32B 2307/732* (2013.01); *B32B 2405/00* (2013.01); *B32B 2451/00* (2013.01); *C08J 2323/12* (2013.01); *C08J 2333/08* (2013.01); *C08J 2429/14* (2013.01); *C08J 2433/08* (2013.01); *D06N 3/04* (2013.01); *D06N 3/042* (2013.01); *D06N 2211/28* (2013.01)

(56) References Cited

U.S. PATENT DOCUMENTS

| | | |
|---|---|---|
| 3,250,808 A | 5/1966 | Moore |
| 3,277,091 A | 10/1966 | Schmelzer |
| 3,591,531 A | 7/1971 | Schroeder |
| 3,661,588 A | 5/1972 | Chang |
| 3,691,140 A | 9/1972 | Silver |
| 3,929,934 A | 12/1975 | Moore |
| 4,000,356 A | 12/1976 | Weisgerber |
| 4,181,752 A | 1/1980 | Martens |
| 4,243,500 A | 1/1981 | Glennon |
| 4,330,590 A | 5/1982 | Vesley |
| 4,418,120 A | 11/1983 | Kealy |
| 4,737,577 A | 4/1988 | Brown |
| 4,833,179 A | 5/1989 | Young |
| 4,855,184 A | 8/1989 | Klun |
| 4,894,259 A | 1/1990 | Kuller |
| 4,968,562 A | 11/1990 | Delgado |
| 4,994,322 A | 2/1991 | Delgado |
| 5,102,731 A | 4/1992 | Takimoto |
| 5,141,790 A | 8/1992 | Calhoun |
| 5,209,971 A | 5/1993 | Babu |
| 5,214,100 A | 5/1993 | Abele |
| 5,246,785 A * | 9/1993 | Matano ............... B41M 1/24 428/156 |
| 5,296,277 A * | 3/1994 | Wilson ............... C09J 7/38 428/40.2 |
| 5,362,516 A | 11/1994 | Wilson |
| 5,461,134 A | 10/1995 | Leir |
| 5,506,279 A | 4/1996 | Babu |
| 5,623,010 A | 4/1997 | Groves |
| 5,677,376 A | 10/1997 | Groves |
| 5,820,957 A * | 10/1998 | Schroeder ............... G02B 1/11 428/40.1 |
| 5,902,836 A | 5/1999 | Bennett |
| 6,113,679 A | 9/2000 | Adkins et al. |
| 6,200,666 B1 * | 3/2001 | Christian ............... C08F 299/00 428/195.1 |
| 6,232,359 B1 | 5/2001 | Christian |
| 6,319,985 B1 | 11/2001 | Bruning |
| 6,423,381 B1 | 7/2002 | Colton |
| 6,498,202 B1 | 12/2002 | Sun |
| 6,576,396 B1 | 6/2003 | Leichsenring |
| 6,660,388 B2 | 12/2003 | Liu |
| 6,664,020 B1 | 12/2003 | Warner |
| 6,778,240 B2 | 8/2004 | Nakamura |
| 6,806,320 B2 | 10/2004 | Everaerts |
| 6,846,075 B2 | 1/2005 | Ylitalo et al. |
| 6,881,458 B2 | 4/2005 | Ludwig |
| 7,072,333 B2 | 7/2006 | Ahn |
| 7,101,618 B2 | 9/2006 | Coggio |
| 7,173,778 B2 | 2/2007 | Jing |
| 7,385,020 B2 | 6/2008 | Anderson |
| 7,416,763 B2 | 8/2008 | Kanda |
| 7,473,462 B2 | 1/2009 | Coggio |
| 7,718,264 B2 | 5/2010 | Klun |
| 8,372,517 B2 | 2/2013 | Tokuchi |
| 8,455,099 B2 | 6/2013 | Chevalier |
| 8,568,849 B2 | 10/2013 | Shi |
| 8,628,855 B2 | 1/2014 | Hao |
| 8,634,146 B2 | 1/2014 | David |
| 9,175,181 B2 | 11/2015 | Butler et al. |
| 9,447,218 B2 | 9/2016 | Mikayama |
| 9,969,911 B2 | 5/2018 | Nakada |
| 2003/0111519 A1 | 6/2003 | Kinney |
| 2003/0224150 A1 | 12/2003 | Ludwig |
| 2004/0077775 A1 | 4/2004 | Audenaert |
| 2004/0253534 A1 | 12/2004 | Kidnie |
| 2004/0260020 A1 | 12/2004 | Miyake |
| 2005/0003222 A1 | 1/2005 | Everaerts |
| 2005/0119365 A1 * | 6/2005 | Bruck .................. C09D 11/101 522/168 |
| 2005/0181943 A1 | 8/2005 | Kidnie |
| 2005/0249763 A1 * | 11/2005 | Legendre ............. A61Q 19/008 424/401 |
| 2007/0032587 A1 | 2/2007 | Nakashima |
| 2007/0148600 A1 | 6/2007 | Hasegawa |
| 2009/0017313 A1 | 1/2009 | Outlaw |
| 2009/0053448 A1 | 2/2009 | Paiva |
| 2010/0015400 A1 * | 1/2010 | Tokuchi .................. B32B 27/30 428/172 |
| 2010/0055418 A1 | 3/2010 | Takamatsu |
| 2010/0058656 A1 | 3/2010 | Chevalier |
| 2010/0060830 A1 * | 3/2010 | Yamada ............... G02B 5/0226 349/96 |
| 2010/0154000 A1 | 6/2010 | Macrae |
| 2011/0034618 A1 | 2/2011 | Register |
| 2011/0076613 A1 | 3/2011 | Yoshida |
| 2011/0112247 A1 | 5/2011 | Tokuchi |
| 2011/0282000 A1 | 11/2011 | Hayes |
| 2012/0003468 A1 | 1/2012 | Husemann |

(56) References Cited

U.S. PATENT DOCUMENTS

| | | | |
|---|---|---|---|
| 2012/0231269 A1 | 9/2012 | Nakagawa | |
| 2012/0260975 A1 | 10/2012 | Gerard | |
| 2012/0288692 A1 | 11/2012 | Broyles | |
| 2013/0004766 A1 | 1/2013 | Abe | |
| 2013/0310509 A1 | 11/2013 | Hannemann | |
| 2014/0030538 A1 | 1/2014 | Boutillier | |
| 2014/0154505 A1 | 6/2014 | Steelman | |
| 2014/0220306 A1* | 8/2014 | Uchida | B29C 37/0053 428/172 |
| 2014/0302281 A1* | 10/2014 | Yacovone | C08F 116/06 428/141 |
| 2015/0175458 A1 | 6/2015 | Momiyama | |
| 2015/0240067 A1* | 8/2015 | Nagai | C08F 261/12 525/221 |
| 2016/0053039 A1 | 2/2016 | Mikayama et al. | |
| 2016/0289440 A1* | 10/2016 | Janoski | C08L 29/14 |
| 2017/0362399 A1 | 12/2017 | Lipscomb | |

FOREIGN PATENT DOCUMENTS

| | | | |
|---|---|---|---|
| CN | 103342968 | 10/2013 | |
| CN | 103589320 | 2/2014 | |
| DE | 102005023405 | 1/2007 | |
| EP | 0411839 | 2/1991 | |
| EP | 0447115 | 9/1991 | |
| EP | 0570254 | 11/1993 | |
| EP | 0570515 | 11/1993 | |
| EP | 0617708 | 10/1994 | |
| EP | 0659844 | 6/1995 | |
| EP | 0710545 | 5/1996 | |
| EP | 0783550 | 7/1997 | |
| EP | 0997750 | 5/2000 | |
| EP | 1038665 | 9/2000 | |
| EP | 2080786 | 7/2009 | |
| EP | 2163571 | 3/2010 | |
| EP | 2284221 | 2/2011 | |
| EP | 2623525 | 8/2013 | |
| EP | 2937733 | 10/2015 | |
| JP | S64-1737 | 1/1989 | |
| JP | H3-258544 | 11/1991 | |
| JP | 09-324165 | 12/1997 | |
| JP | 10-168271 | 6/1998 | |
| JP | 10-292013 | 11/1998 | |
| JP | 2000-247014 | 9/2000 | |
| JP | 2003-040653 | 2/2003 | |
| JP | 2004-331413 | 11/2004 | |
| JP | 2005-015654 | 1/2005 | |
| JP | 2005-054065 | 3/2005 | |
| JP | 2006-150965 | 6/2006 | |
| JP | 2007-023145 | 2/2007 | |
| JP | 2007-277050 | 10/2007 | |
| JP | 2008-055690 | 3/2008 | |
| JP | 2008-106254 | 5/2008 | |
| JP | 2009-102467 | 5/2009 | |
| JP | 2010-083909 | 4/2010 | |
| JP | 5255390 | 4/2010 | |
| JP | 2011-012127 | 1/2011 | |
| JP | 2011-089027 | 5/2011 | |
| JP | 2014-005192 | 1/2014 | |
| JP | 5610604 | 10/2014 | |
| JP | 2014-224234 | 12/2014 | |
| KR | 0148852 | 10/1998 | |
| KR | 101289947 | 7/2013 | |
| WO | WO 1992-13924 | 8/1992 | |
| WO | WO 1995-013331 | 5/1995 | |
| WO | WO 1996-001687 | 1/1996 | |
| WO | WO 1998-015601 | 4/1998 | |
| WO | WO 1998-029516 | 7/1998 | |
| WO | WO 1999-003907 | 1/1999 | |
| WO | WO 2000-012574 | 3/2000 | |
| WO | WO 2003-012459 | 2/2003 | |
| WO | WO 2004-044019 | 5/2004 | |
| WO | WO 2005-023913 | 3/2005 | |
| WO | WO 2005-058594 | 6/2005 | |
| WO | WO-2005058594 A1 * | 6/2005 | B32B 27/08 |
| WO | WO 2006-094177 | 9/2006 | |
| WO | WO 2006-102383 | 9/2006 | |
| WO | WO 2009-029438 | 3/2009 | |
| WO | WO 2009-041017 | 4/2009 | |
| WO | WO 2009-146227 | 12/2009 | |
| WO | WO 2010-078071 | 7/2010 | |
| WO | WO 2010-078346 | 7/2010 | |
| WO | WO 2010-141345 | 12/2010 | |
| WO | WO-2010141345 A1 * | 12/2010 | G02B 5/02 |
| WO | WO 2011-042665 | 4/2011 | |
| WO | WO 2011-088096 | 7/2011 | |
| WO | WO 2011-094342 | 8/2011 | |
| WO | WO 2011-094350 | 8/2011 | |
| WO | WO 2012-069587 | 5/2012 | |
| WO | WO 2012-136941 | 10/2012 | |
| WO | WO 2012-148421 | 11/2012 | |
| WO | WO 2013-019699 | 2/2013 | |
| WO | WO 2013-019706 | 2/2013 | |
| WO | WO 2013-019766 | 2/2013 | |
| WO | WO 2013-019772 | 2/2013 | |
| WO | WO 2013/035839 | 3/2013 | |
| WO | WO 2014-050746 | 4/2014 | |
| WO | WO 2014-123766 | 8/2014 | |
| WO | WO 2014-156214 | 10/2014 | |
| WO | WO 2014-172185 | 10/2014 | |
| WO | WO 2014-179432 | 11/2014 | |
| WO | WO 2015-064219 | 5/2015 | |
| WO | WO 2015-157350 | 10/2015 | |
| WO | WO 2015-187770 | 12/2015 | |
| WO | WO 2016-094112 | 6/2016 | |
| WO | WO 2016-094277 | 6/2016 | |
| WO | WO 2016-094280 | 6/2016 | |
| WO | WO 2017-112453 | 6/2017 | |
| WO | WO 2017-112458 | 6/2017 | |
| WO | WO 2017-112537 | 6/2017 | |
| WO | WO 2017-112564 | 6/2017 | |
| WO | WO 2017-214007 | 12/2017 | |

OTHER PUBLICATIONS

Elizalde et al. "Knowledge-based control of emulsion polymerization: Tailoring adhesive properties," J.Coating Tech., vol. 1, No. 1, pp. 45-51, published Jan. 2004 (Year: 2004).*

Sigma-Aldrich, "Thermal transitions of homopolymers: Glass Transition & Melting Point," accessed Oct. 4, 2019) (Year: 2019).*

Rueda-de-la-Garza-G-1988-PhD-Thesis—1987 (Year: 1987).*

Pavlenic—Abstact—Influence of Crosslinking on Surface Hardness of PMMA—J.Macromolecular Science, Part A. vol. 34, No. 1 (Year: 1997).*

Tripathy—PBT-PVB blends prepared in-situ polymerization of PBT—Polymer 2003 (Year: 2003).*

Gower—Acrylic acid level v adhesive performance—J.Poly.Sci. B—2006 (Year: 2006).*

3M™ Screen Printing Ink 1905 Black, Apr. 19, 2016, 1page.

3M™ Screen Printing UV Ink 9802 Opaque Black, Jan. 19, 2016, pp. 2-3.

Chen, W., et al., Macromolecules, 2001, vol. 34, pp. 4277-4284.

FG00099—Vutek® GSLXR 3M Superflex Ink, Mar. 17, 2015, 3pgs.

HP Safety Data Sheet, C4940 Series, 9380 Version No. 02, May 14, 2015, 1pg.

"Intro in Properties and Applications," Specialized in Specialties, KSE ®Mowital, pp. 1-84.

Roland Data Sheet, ECO-SOL MAX2, ESL4-CY, ECO-SOL MAX2, ESL4-4CY, v. G_5.0, Dec. 21, 2015.

Standard Test Method for Tensile Properties of Thin Plastic Sheeting_ 10 Pages.

International Search Report for PCT International Application No. PCT/US2015/064215, dated Mar. 18, 2016, 5 pages.

International Search Report for PCT International Application No. PCT/US2015/064219, dated Mar. 18, 2016, 4 pages.

International Search Report for PCT International Application No. PCT/US2015/063073, dated Feb. 26, 2016, 4 pages.

(56) References Cited

OTHER PUBLICATIONS

International Search Report for PCT International Application No. PCT/US2016/066309, dated Sep. 26, 2017, 8 pages.
International Search Report for PCT International Application No. PCT/US2016/066348, dated Mar. 31, 2017, 7pgs.
"Nanodiamond dispersion for solvent based fluoropolymer coatings", Datasheet, 2016, Diamond Additive, 1 page.
Aran, "Tailoring the swelling and glass-transition temperature of acrylonitrile/hydroxyethyl acrylate copolymers", Journal of applied polymer science, 2010, vol. 116, pp. 628-635.
Butvar, "Polyvinyl butyral resin, properties and uses",pp. 01-32.
Carbodeon, "Carbodeon company presentation on nanodiamond additives to fluoropolymer coatings and composites", 20 pages.
Eastman, Product Data Sheet, "Tenite™ Propionate 307E4000018 Clear, Trsp", 2000 [retrieved from the internet on May 25, 2017], URL <http://ws.eastman.com/ProductCatalogApps/PageControllers/ProdDatasheet_PC.aspx?Pro>, pp. 1-2.
Kse, "Introduction in properties and applications", Mowital, pp. 01-84.
Kse, "Polyvinyl butyral of superior quality", Mowital, pp. 01-36.
Kuraray, "Technical data sheet", Mowital, 2 pages.
Pocius, Adhesion and Adhesive Technology ,3rd Ed., 2012, pp. 287-291.
Rohm and Haas, "Pressure sensitive adhesives", 2006, pp. 01-02.
Sideridou-Karayannidou, "Synthesis and characterization of copolymers of N-vinylcarbazole and N,N-dimethylaminoethyl acrylate", Polymer, 1999, vol. 40,No. 17 , pp. 4915-4922.
Wakabayashi, "Studies on $s$—Triazines. I. Contrimerization of Trichloroacetonitrile With Other Nitriles," Bulletin of the Chemical Society of Japan, 1969, vol. 42, pp. 2924-2930.
International Search Report for PCT International Application No. PCT/US2016/066453, dated Sep. 1, 2017, 5 pages.

\* cited by examiner

ACRYLIC FILMS COMPRISING A STRUCTURED LAYER

CROSS REFERENCE TO RELATED APPLICATIONS

This application is a national stage filing under 35 U.S.C. 371 of PCT/US2016/066453, filed Dec. 14, 2016, which claims the benefit of U.S. Provisional Application No. 62/346,760, filed Jun. 7, 2016, and U.S. Provisional Application No. 62/270,746, filed Dec. 22, 2015, the disclosure of which is incorporated by reference in its/their entirety herein.

SUMMARY

A film is described comprising a (meth)acrylic polymer and polyvinyl acetal polymer composition comprising polymerized units having the following formula

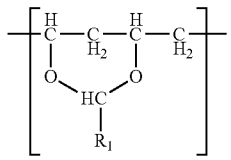

wherein $R_1$ is hydrogen or a C1-C7 alkyl group; and wherein the film comprises a structured layer.

In some embodiments, the structured layer comprises a base film layer and structures disposed on a major surface of the base film layer, wherein the base film layer and/or structures comprise the (meth)acrylic polymer and polyvinyl acetal polymer composition.

In other embodiments, the structured layer comprises a base film layer, structures comprising peaks and valleys disposed on a major surface of the base film layer, and a filling material at least partially filling the valleys. In this embodiment, the base film layer, and/or the structures, and/or the filling material comprise the (meth)acrylic polymer and polyvinyl acetal polymer composition.

In yet another embodiment, the film comprises a backing proximate the base film layer. In this embodiment, the base film layer, and/or the structures, and/or the filling material, and/or the backing comprises the (meth)acrylic polymer and polyvinyl acetal polymer composition.

DETAILED DESCRIPTION

Presently described are films comprising a (meth)acrylic polymer and polyvinyl acetal polymer composition. The films comprise a structured layer.

Figure 1:
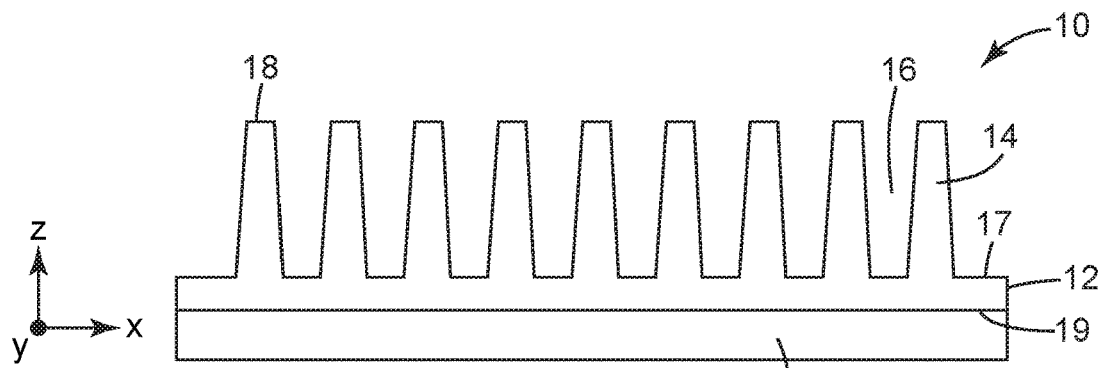
FIG. 1 illustrates a cross-sectional view of an embodied structured film comprising peak structures.

FIG. 1 illustrates a cross-sectional view of an embodied film 10 comprising a structured layer. The structured layer comprises a base film layer 12 and an array of structures 14 disposed on the base film layer 12. In this embodiment, the structures 14 project from and extend away from surface 17 of the base film layer 12. The structures 14 also project from and extend away from major opposing (e.g. planar) surface 19 of the film. Structures 14 can be defined by positive z-axis coordinates relative to surface 17 or xy planar surface 19. Such structures may be characterized as peaks, posts, and the like. Structures 14 have a height (h) defined by the distance between the major surface 17 and the opposing top surface 18 of the structures. The structured surface typically includes valleys 16 adjacent the (e.g. peak) structures 14. When structured layer 10 is an exposed surface layer, the valleys are filled with air.

Figure 2:
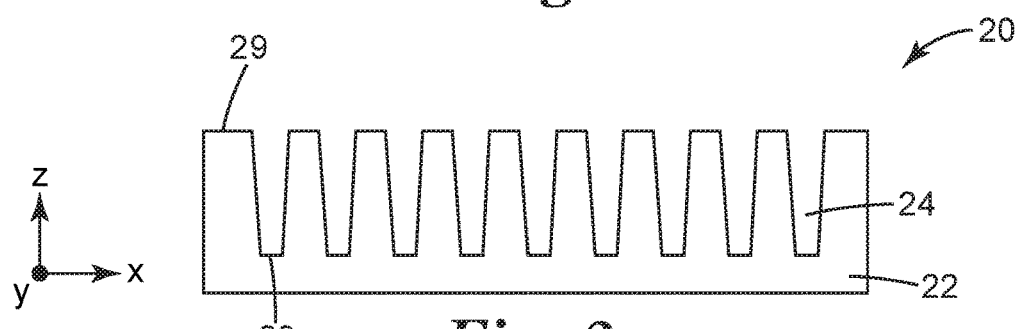
FIG. 2 illustrates a cross-sectional view of an embodied structured film comprising valley structures.

FIG. 2 illustrates a cross-sectional view of another embodied film 20 comprising a structured layer. The structured layer comprises a base film layer 22 and an array of structures 24 disposed on the base film layer 22. In this embodiment, the structures 24 project into the film relative to major (e.g. planar) surface 29. Structures 24 may be characterized as valleys, cavities, and the like. Structures 24 can be defined by negative z-axis coordinates relative to xy planar surface 29. Structures 24 have a height (h) defined by the distance between the major surface 29 and the opposing bottom surface 28 of the valley. When structured layer is an exposed surface layer, the valleys are filled with air.

In some embodiments, the structures are integral with the base film layer as depicted in FIGS. 1 and 2. In some embodiments, the structures and base film layer comprise a (meth)acrylic polymer and polyvinyl acetal polymer composition, as described herein. In some embodiments, the structures and base film layer comprise the same material.

In one embodiment, the film comprising structures integral with the base film layer is prepared by applying a composition comprising solvent (meth)acrylate monomer and polyvinyl acetal polymer composition, as described herein, to a structured release liner. The composition is applied such that material fills the cavities between the (e.g. peak) structures of the release liner and the filled cavities are joined to each other by a base film layer also comprising the solvent (meth)acrylate monomer and polyvinyl acetal polymer composition. The resulting film is a negative replication of the structured release liner. Various structured liners are commercially available such as from Sappi Warren Release Papers, Westbrooke, Me.

In other embodiments, the structures are not integral with the base film layer.

Figure 3:
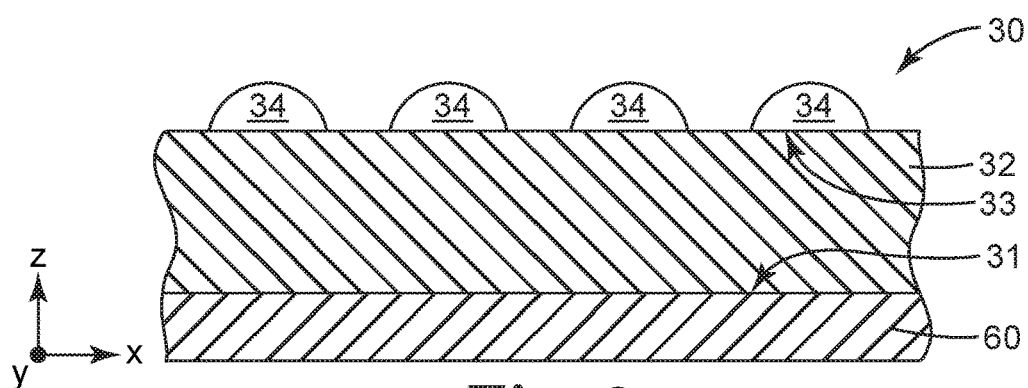
FIG. 3 illustrates a cross-sectional view of another embodied structured film comprising peak structures.

For example, FIG. 3 depicts film 30 comprising a structured layer. The structured layer comprises a base film layer 32 and an array of (e.g. peak) structures 34 disposed on the base film layer 32. An interface 33 is typically evident in cross-section between the base film layer 32 and the structures 34.

In one embodiment, the structures are not integral with the base film layer due to the structures being prepared in separate steps rather than concurrently with the base film layer.

Alternatively or in combination thereof, the structures are not integral with the base film layer due to the structures and base film layer comprising different materials. In some embodiments, the base film layer comprises a (meth)acrylic polymer and polyvinyl acetal polymer compositions and the structures comprise a different material. In other embodiments, the structures comprises a (meth)acrylic polymer and polyvinyl acetal polymer composition and the base film layer comprises a different material. In some embodiments, the structures and the base film layer both comprise (meth)acrylic polymer and polyvinyl acetal polymer composition, but the compositions are not the same. For example, the compositions may have a different color, different opacity, or different concentration of polymerized units of a specified monomer.

The structured layer of FIG. 3 can also be prepared by use of a structured liner. For example, a composition comprising a first (e.g. free-radically) polymerizable material can be applied to a structured release liner such that the first material only fills the cavities between the structures of the release liner. A second (e.g. free-radically) polymerizable material is then applied to the filled cavities forming the base film layer. The resulting film is a negative replication of the structured release liner.

The structured surface of FIG. 3 can also be formed by providing a discontinuous pattern-coated layer on the surface of a base film layer. By discontinuous, it is meant discontinuous in the x and/or y direction of the xy plane. In this embodiment, the base film layer and/or the discontinuous pattern coated layer comprises a (meth)acrylic polymer and polyvinyl acetal polymer composition, as described herein.

With reference to FIG. 3, the discontinuous patterned layer is shown as four discrete peak structures 34. In this embodiment, the pattern-coated layer is discontinuous in both the x and y direction of the xy plane providing discrete features, that may also be characterized as islands. When the pattern-coated layer is discontinuous in the x or y direction, the pattern may be characterized as linear or non-linear stripes. The thickness of the discontinuous patterned layer and thus the average height of the structures 34 is typically at least 1, 2, 3, 4, or 5 microns. In some embodiments, the thickness of the discontinuous patterned layer ranges up to 10, 15, 20, or 25 microns.

In plan view the structures may be arranged in various patterns. When the pattern-coated layer is transparent or when the length and width of the structures in plan view are sufficiently small, the structures may not be readily visible in the absence of a microscope. However, larger structures as well as structures having a contrasting color relative to the base film layer can be readily visible and utilized for the purpose of providing a decorative two-tone effect.

In some embodiments, the structured layer is a structured surface layer as depicted in FIGS. 1-3. The structured surface layer may be characterized as the "outermost" or "exposed" surface layer. In such embodiment, the valleys of the structured surface comprise air.

In another embodiment, the structured layer is between the opposing major surfaces of the film.

Figure 4:
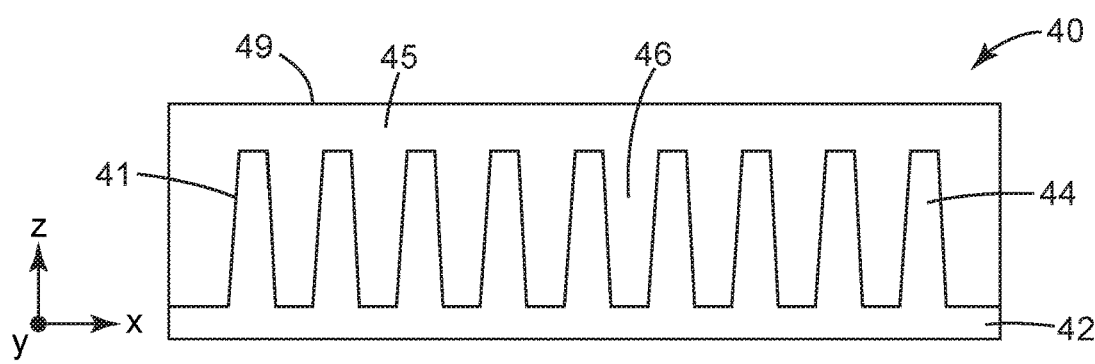
FIG. 4 illustrates a cross-sectional view of an embodied structured film comprising peaks and valleys wherein the valleys further comprises a filling material.

FIG. 4 illustrates a cross-sectional view of another embodied film 40 comprising a structured layer. The structured layer comprises a base film layer 42 and an array of (e.g. peak) structures 44 disposed on (and optionally integral with) the base film layer 42. The structured surface typically includes valleys 46 adjacent the peak structures 44. The valleys are at least partially filled and may be completely filled with a filling material 45. The structured surface layer may be characterized as an internally structured surface 41, rather than externally structured surface. In one embodiment, surface 49 is unstructured, as depicted. In this embodiment, the filling material may have a thickness equal to or greater than the height of the valley structures. In another embodiment, the filling material may have a thickness less than the height of the valley structures. In this later embodiment, the filling material partially fills the valleys (not shown) such that surface 49 is structured.

In this embodiment, at least one of the base film layer, or the structures, or the filling material, or combinations comprise a (meth)acrylic polymer and polyvinyl acetal polymer composition, as described herein. In some embodiments, a transparent filling material comprising (meth)acrylic polymer and polyvinyl acetal polymer composition, is provided in the valleys of a structured layer having a different color and/or different opacity.

In some embodiments, the structures, and/or base film layer, and/or filling material comprises a (e.g. free-radically) polymerizable composition that comprises a (meth)acrylic polymer without a polyvinyl acetal polymer.

The (meth)acrylic polymer composition may comprise at least 50 wt.-%, 60 wt.-%, 70 wt.-%, 80 wt.-%, or 90 wt.-% of one or more multifunctional free-radically polymerizable monomer(s) and/or oligomer(s) that can be phototcured once the composition has been coated. Useful multi-(meth)acrylate monomers and oligomers include:

(a) di(meth)acrylate such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acrylates such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acrylates such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acrylates such as, for example, urethane acrylates, polyester acrylates, and epoxy acrylates can also be employed. In some embodiments, the (e.g. free-radically) polymerizable composition includes both poly (meth)acrylate and polyurethane material, which can be termed a "urethane acrylate."

Various (meth)acrylate monomers and oligomers are widely available from vendors such as, for example, Sartomer Company of Exton, Pa.; UCB Chemicals Corporation of Smyrna, Ga.; and Aldrich Chemical Company of Milwaukee, Wis.

In some embodiments, the structures, and/or base film layer, and/or filling material further comprises inorganic oxide nanoparticles. The inorganic oxide nanoparticles can comprise silica, or can comprise a combination of oxides, such as silica and aluminum oxide, or a core of an oxide of one type (or a core of a material other than a metal oxide) on which is deposited an oxide of another type. Various high refractive index inorganic oxide nanoparticles can be employed such as for example zirconia ("$ZrO_2$"), titania ("$TiO_2$"), antimony oxides, alumina, tin oxides, alone or in combination. Mixed metal oxide may also be employed.

The inorganic nanoparticles are preferably treated with a surface treatment agent. Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing. The incorporation of surface modified inorganic particles is amenable to covalent bonding of the particles to the free-radically polymerizable (e.g. monomer and/or oligomer) organic components, thereby providing a tougher and more homogeneous polymer/particle network.

In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other for siliceous fillers. Silanes and carboxylic acids are preferred for metal oxides such as zirconia. The surface modification can be done either subsequent to mixing with the monomers or after mixing. It is preferred in the case of silanes to react the silanes with the particle or nanoparticle surface before incorporation into the resin. The required amount of surface modifier is dependent upon several factors such as particle size, particle type, modifier molecular weight, and modifier type. In general, it is preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Surface treatment agents such as carboxylic acids may not require elevated temperatures or extended time.

Representative embodiments of surface treatment agents include compounds such as, for example, isooctyl trimethoxy-silane, N-(3-triethoxysilylpropyl) methoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate (BCEA), 2-(2-methoxyethoxy)acetic acid, methoxyphenyl acetic acid, and mixtures thereof.

In some embodiments, the base film layer comprises a (meth)acrylic polymer and polyvinyl acetal resin and the structures and/or filling material comprises a cured (meth) acrylic polymer composition typically having a higher glass transition temperature, Tg, than the base film layer. In some embodiments, the Tg of the cured composition of the structures and/or filling material is greater than 40, 45, 50, 55, or 60° C.

In yet other embodiments, the base film layer of any of the embodiments described herein may be disposed upon or bonded (e.g. with an adhesive) to a backing (e.g. 50 of FIG. 1). In this embodiment, the base film layer and/or the structures and/or the filling material and/or the backing comprises a (meth)acrylic polymer and polyvinyl acetal resin composition, as described herein.

The base film layer 32 and/or backing 50 can comprise a variety of flexible and inflexible (e.g. preformed web) substrates including but not limited to polymeric films, woven or nonwoven fabrics, metal foils, foams, paper, and combinations thereof (e.g. metalized polymeric film). Polymeric films include for example polyolefins such as polypropylene (e.g. biaxially oriented), polyethylene (e.g. high density or low density), polyvinyl chloride, polyurethane, polyester (polyethylene terephthalate), polycarbonate, polymethyl (meth)acrylate (PMMA), polyvinylbutyral, polyimide, polyamide, fluoropolymer, cellulose acetate, cellulose triacetate, ethyl cellulose, as well as bio-based material such as polylactic acid (PLA). The woven or nonwoven fabric may comprise fibers or filaments of synthetic or natural materials such as cellulose (e.g. tissue), cotton, nylon, polyethylene, rayon, glass, ceramic materials, and the like.

In some embodiments, the backing is a transparent film having a transmission of visible light of at least 90 percent. In other embodiments, the backing is opaque (e.g. white) or reflective.

In another embodiment, the base film layer or second backing may further comprise a metal or metal oxide layer. Examples of metals include aluminum, silicon, magnesium, palladium, zinc, tin, nickel, silver, copper, gold, indium, stainless steel, chromium, titanium, and so on. Examples of metal oxides used in the metal oxide layer include aluminum oxide, zinc oxide, antimony oxide, indium oxide, calcium oxide, cadmium oxide, silver oxide, gold oxide, chromium oxide, silicon oxide, cobalt oxide, zirconium oxide, tin oxide, titanium oxide, iron oxide, copper oxide, nickel oxide, platinum oxide, palladium oxide, bismuth oxide, magnesium oxide, manganese oxide, molybdenum oxide, vanadium oxide, barium oxide, and so on. These metals and metal oxides may be used singly or in combination of two or more. Layers of these metals and/or metal oxides can be formed by known methods such as vacuum deposition, ion plating, sputtering, and CVD (Chemical Vapor Deposition). The thickness of the metal and/or metal oxide layer is typically at least 5 nm ranging up to 100 or 250 nm.

The thickness of the backing is typically at least 10, 15, 20, or 25 microns (1 mil) and typically no greater than 500 microns (20 mil) thickness. In some embodiments, the thickness of the backing is no greater than 400, 300, 200, or 100 microns. The base film layer may have the same thickness as the backing. However, the base film layer, particularly when utilized in combination with a backing, may be less than 10 microns. In some embodiments, the base film layer is typically at least 250 nm, 500 nm, 750 nm or 1 micron. The backing as well as the overall film is typically in the form of a roll-good, but may also be in the form of individual sheets.

In some embodiments, the base film layer, backing and/or overall film is conformable. By "conformable" it is meant that the film, base film layer, or backing is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

Suitable conformable base film layer and/or backings include, for example, polyvinyl chloride (PVC), plasticized polyvinyl chloride, polyurethane, polyethylene, polypropylene, fluoropolymer or the like. Other polymer blends are also potentially suitable, including for example thermoplastic polyurethane and a cellulose ester.

In some embodiments, the conformable base film layer, backing and/or overall film has sufficient inelastic deformation after being stretched so that when stretched, the film does not recover to its original length. In some embodiments, the base film layer, backing, and/or overall film has an inelastic deformation of at least 5% after being stretched once to 115% of their original length. In other embodiments, the conformability of the base film layer, backing and/or overall film as determined by % tensile set (as described in PCT Application No. PCT/US2015/64215, filed Dec. 7, 2015) is at least 20, 25, or 30%.

With reference to FIGS. 1-4 the base film layer refers to the film layer the structures are in contact with, optionally further comprising a primer or adhesion-promoting treatment disposed between the base film layer and structures. The backing is an additional layer proximate the base film layer. The backing may be in contact with the base film layer. Alternatively, a primer, adhesion-promoting treatment, or adhesive may be disposed between the base film layer and the backing.

Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. The base film layer and/or backing may also be subjected to an adhesion-promoting treatment such as air or nitrogen corona treatment, plasma, flame, or actinic radiation.

In some embodiments, the (e.g. peak or vallyer) structures of the structured layer may nominally have the same height. In other embodiments, the structures may have more than one height. When the structures have more than one height, the structures of the structured film can be characterized by an average height.

The (e.g. average) height of the structures typically ranges from 25 nm to about 1, 1.5, or 2 mm. Structures with a height of greater than 2 mm can be prepared by successively coating and curing multiple layers. When the (e.g. average) height of the structures is less than 1 micron, the structures may be characterized as nanostructures. When the structures have an (e.g. average) height ranging from 1 micron to less than 1 mm, the structures may be characterized as microstructures. In some embodiments, the (e.g. average) height of the macrostructures is at least 25, 50, 100, 150, 200, 250, 300, 350, 400, or 500 microns. When the structures have an (e.g. average) height greater than 1 mm, the structures may be characterized as macrostructures. In some embodiments, the structures are of sufficient height that the structure can be detected by touch.

The height of the structures can be determined by any suitable manner. For example a cross-section of the structured film can be evaluated, typically aided by the use of an appropriate microscope. For microstructures and nanostructures atomic force microscopy (AFM), confocal scanning laser microscopy (CSLM), or phase shifting interferometry (PSI) can be used, typically in combination with a Wyko Surface Profiler, to determine the length, width, as well as peak or valley height of the structures. A suitable sample size or number of samples are evaluated depending on the complexity of the structured surface.

The structures can be characterized as having a length, defined by the longest dimension in plan view, and a width, defined by the shortest dimension in plan view. Thus, the length and width can be defined by coordinates of the x- and y-axis. The width and length of the structures can vary. The length and width of the structures can meet the same parameters as the height of the structures, as previously described. However, the length and width are not limited or only limited by the size of the input materials utilized to make the film such as the size of a structured liner or limited by the size of the manufacturing equipment. In some embodiments, the structures have a length in plan view ranging up to 10, 20, 30, 40, or 50 cm. In some embodiments, the structures have a width in plan view ranging up to 2, 3, 4, or 5 mm.

FIGS. 5-9 depict black and white photocopies of plan views of some illustrative (e.g. decorative) films comprising a structured layer. The structures are depicted in actual size, being of sufficient length and width that the structures are readily visible to one of normal vision at a distance of about 1 m.

Figure 5:
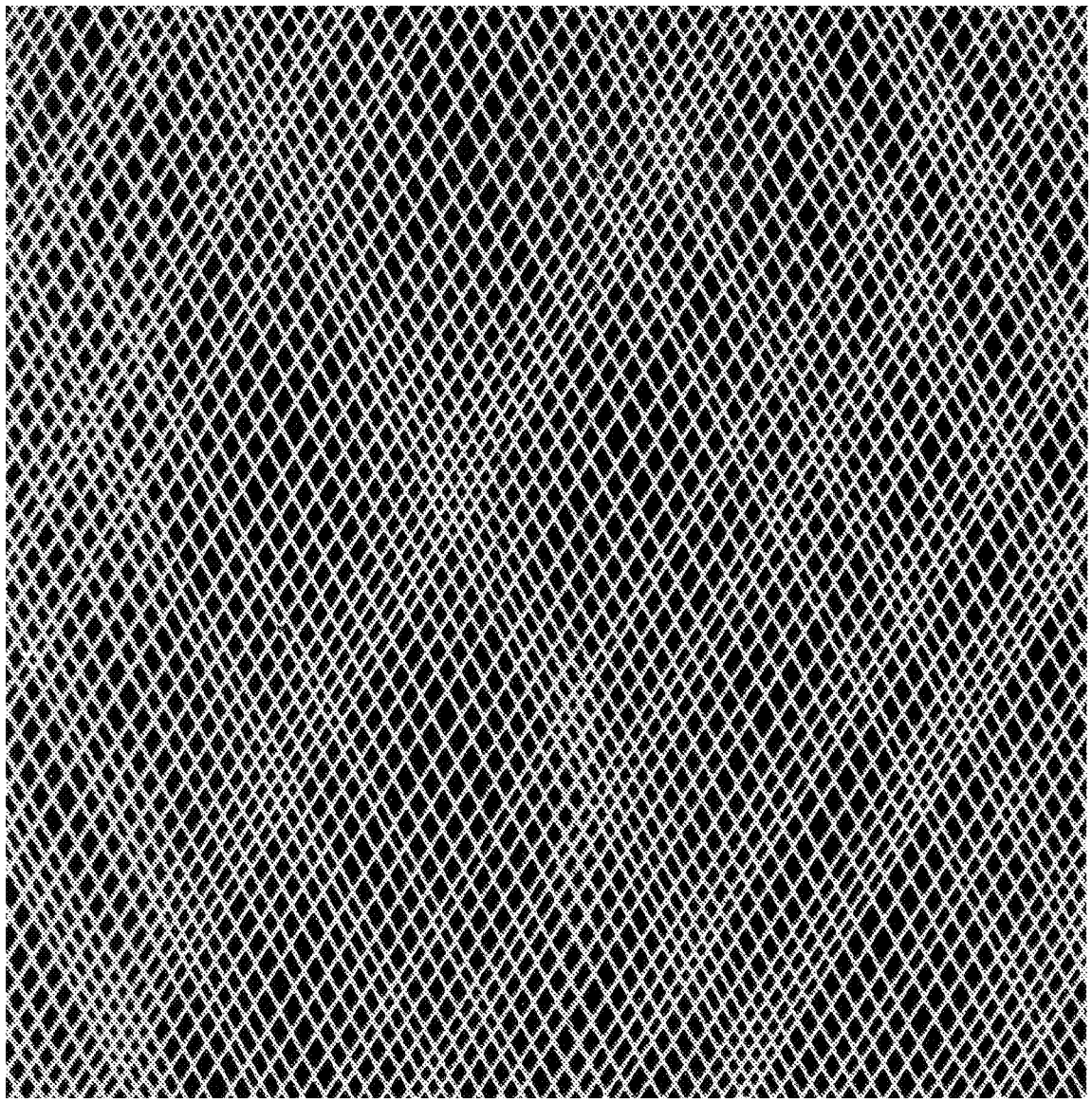
FIG. 5 illustrates a plan view of an embodied structured film.

FIG. 5 can be characterized as comprising a plurality of diamond shaped peak structures, depicted in black, disposed on a white base film layer. The structured surface comprises an array of diamond shaped peak structures of different sizes, the smallest diamond shaped peaks having a length of about 1 mm and the largest diamond shaped peaks having a length of about 5 mm. The diamond shaped peak structures have nominally the same height as can be determined from cross-sectional analysis. The height may range from about 1 micron to about 1 mm. The diamond shaped peak structures are arranged in a repeating pattern having a repeat length longer than the sample size depicted.

Figure 6:
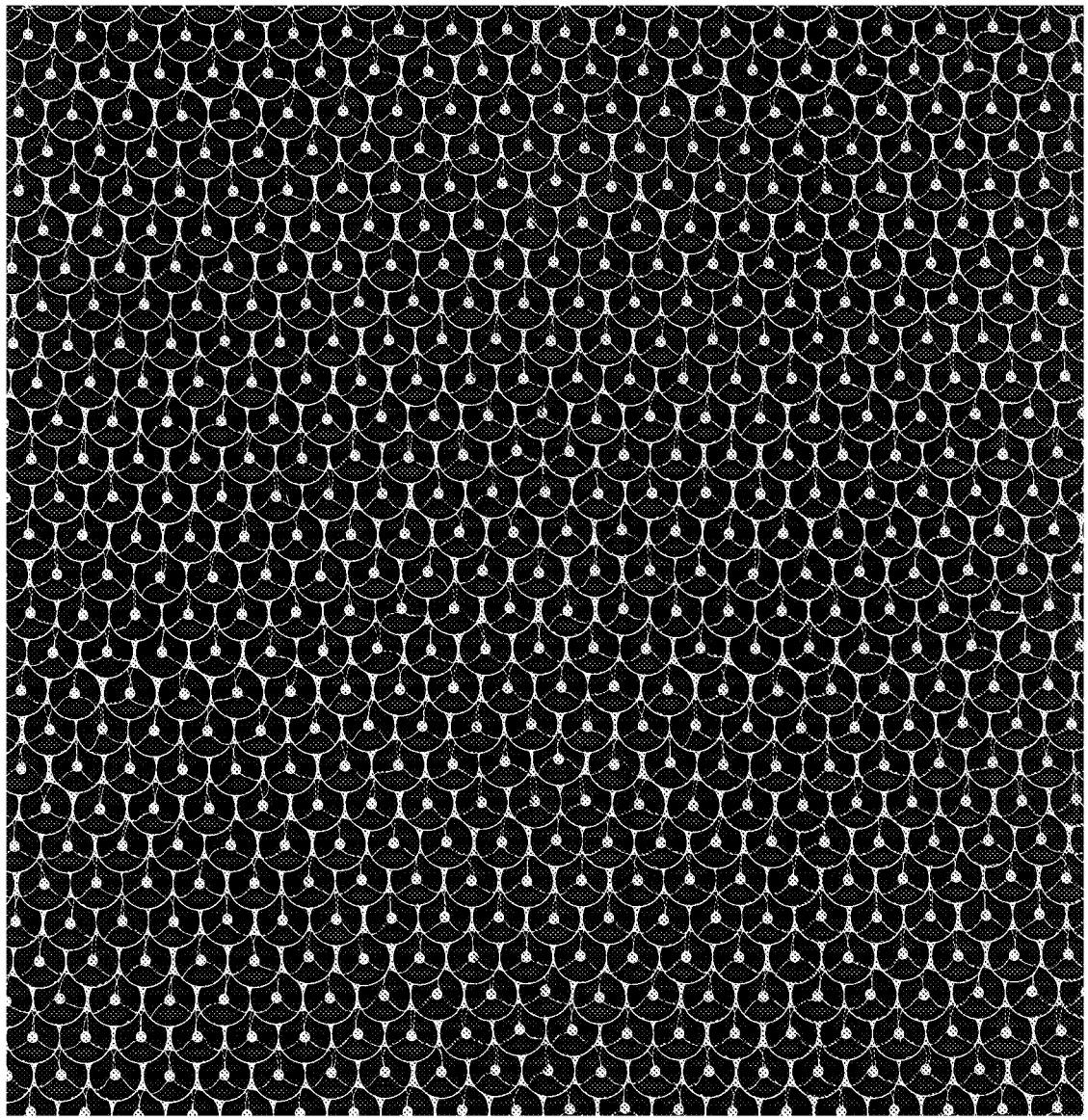
FIG. 6 illustrates a plan view of another embodied structured film.

FIG. 6 can be characterized as comprising a plurality of overlapping circular shaped peak structures, depicted in black, disposed on a white base film layer forming a pattern. The circular shaped peak structures are the same size, having a diameter of about 7 mm. The circular shaped peak structures have nominally the same height as can be determined in cross section. The height may range from about 1 micron to about 1 mm. The circular shaped peak structures are arranged in a repeating pattern.

Figure 7:
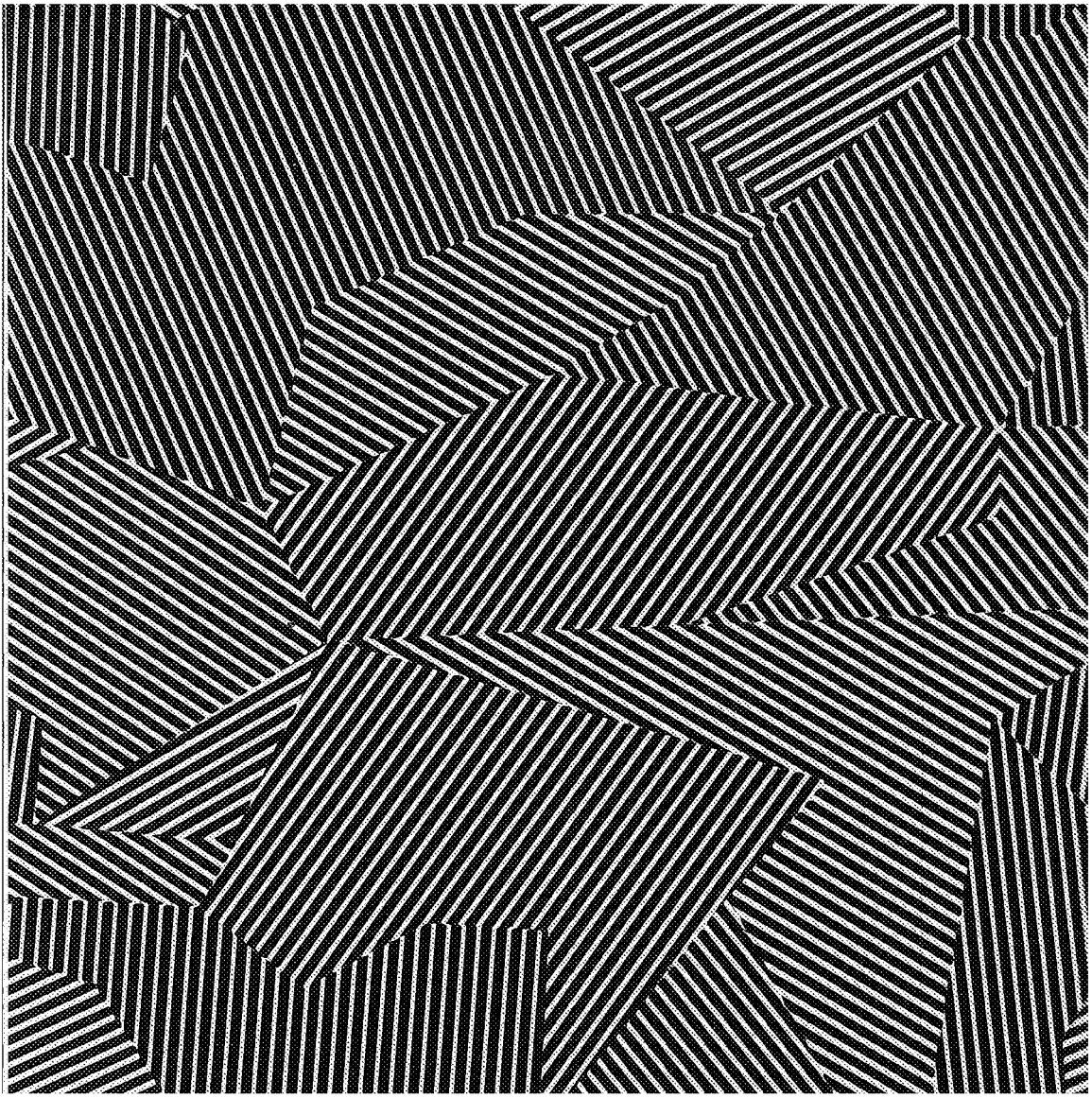
FIG. 7 illustrates a plan view of another embodied structured film.

FIG. 7 can be characterized as comprising a plurality of linear shaped peak structures, depicted in black, disposed on a white base film layer forming a pattern. The structured surface comprises an array of linear shaped peak structures having the same width, i.e. about 1 mm. The length of the linear shaped peak structures may range from a few millimeters to about 9 cm. The linear shaped peak structures have nominally the same height of about 1 mm, as can be determined in cross section. The linear shaped peak structures are arranged in a repeating pattern having a repeat length longer than the sample size depicted.

Figure 8:
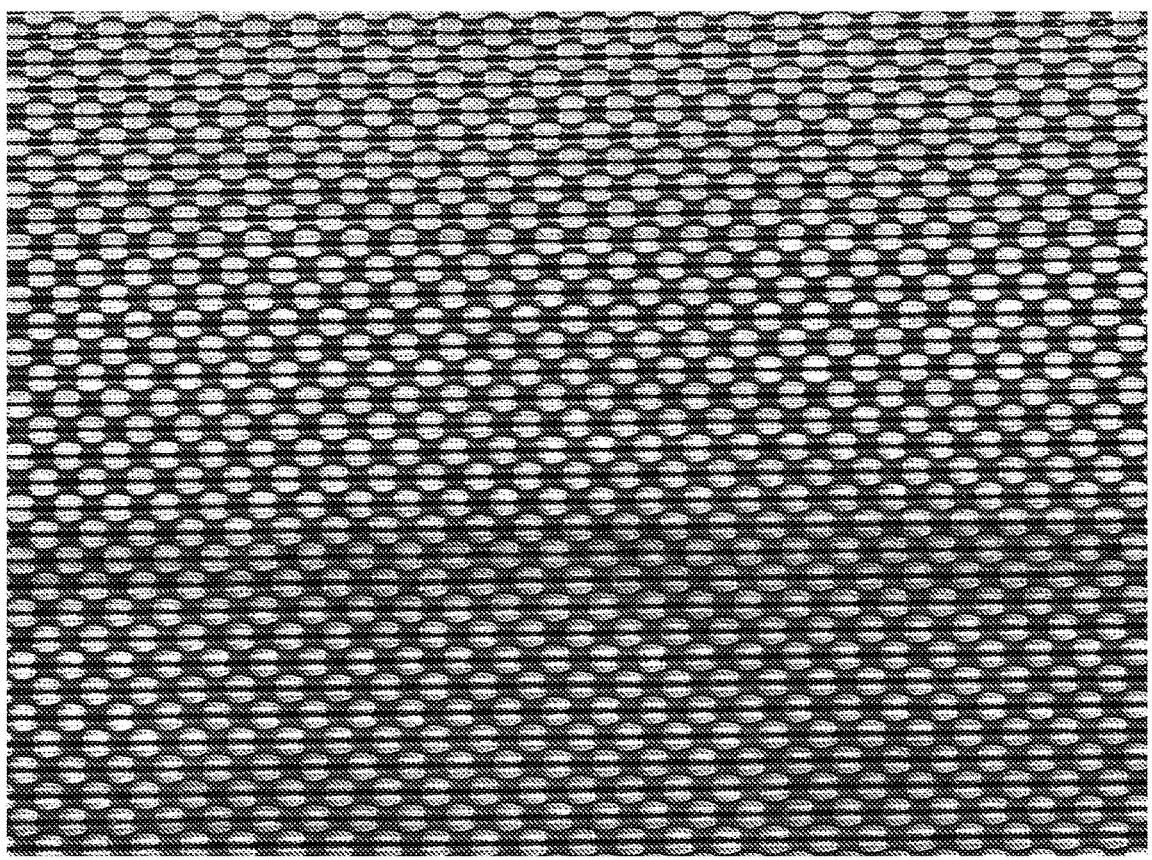
FIG. 8 illustrates a plan view of another embodied structured film.

FIG. 8 can be characterized as comprising a plurality of peak structures, depicted in black, disposed on a white base film layer forming a pattern. The peak structures have a length and width of about 3 mm and nominally have the same height of about 250 microns, as can be determined in cross section. The peak structures are arranged in a repeating pattern.

Figure 9:
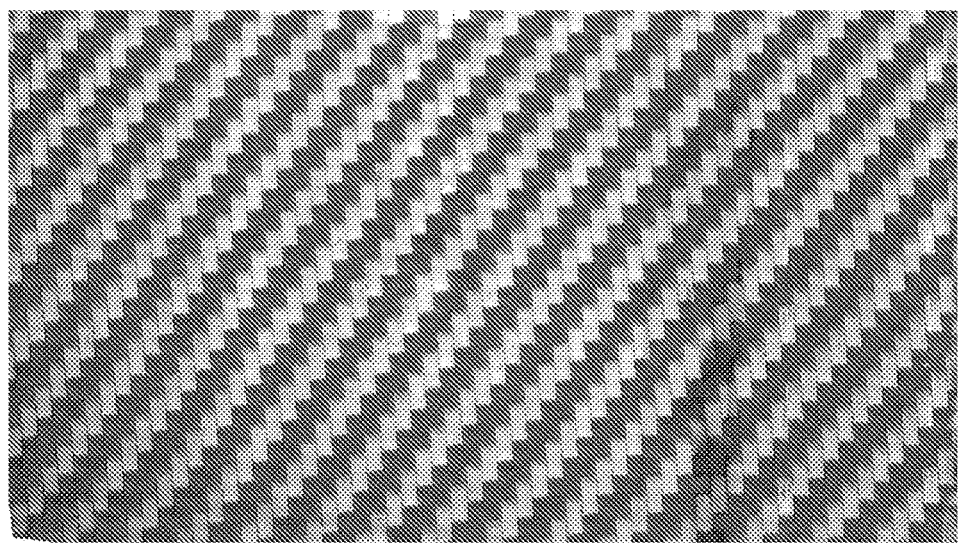
FIG. 9 illustrates a plan view of another embodied structured film.

FIG. 9 can be characterized as comprising a plurality of rectangular peak structures, depicted in black. The valleys between the peaks have been filled with a white filling material. The rectangular peak structures have a length 3 mm and width of about 2 mm and nominally have the same height of about 250 microns, as can be determined in cross section. The plurality of peak structures form diagonal zig-zag stripes separated by the white filling material arranged in a repeating pattern.

Figure 10:
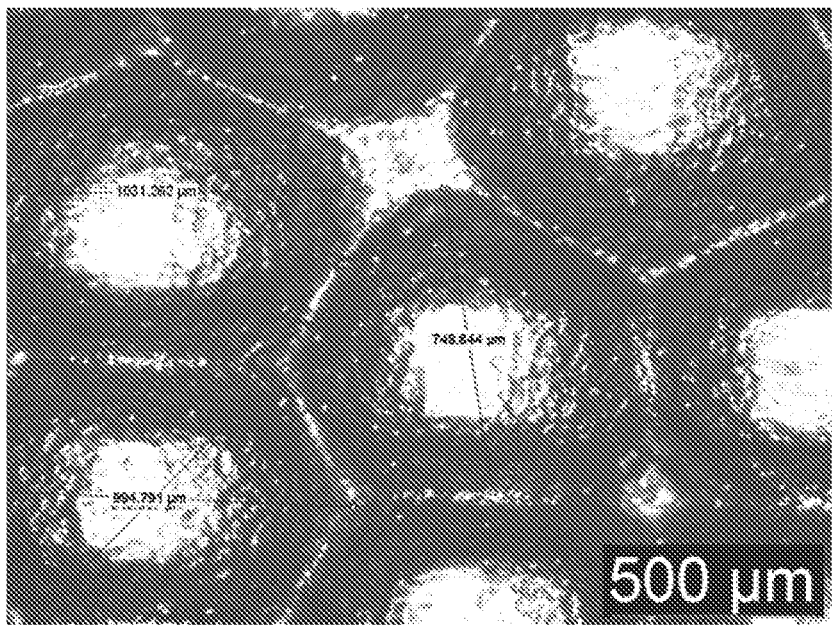
FIG. 10 illustrates a plan view of another embodied structured film.
Figure 11:
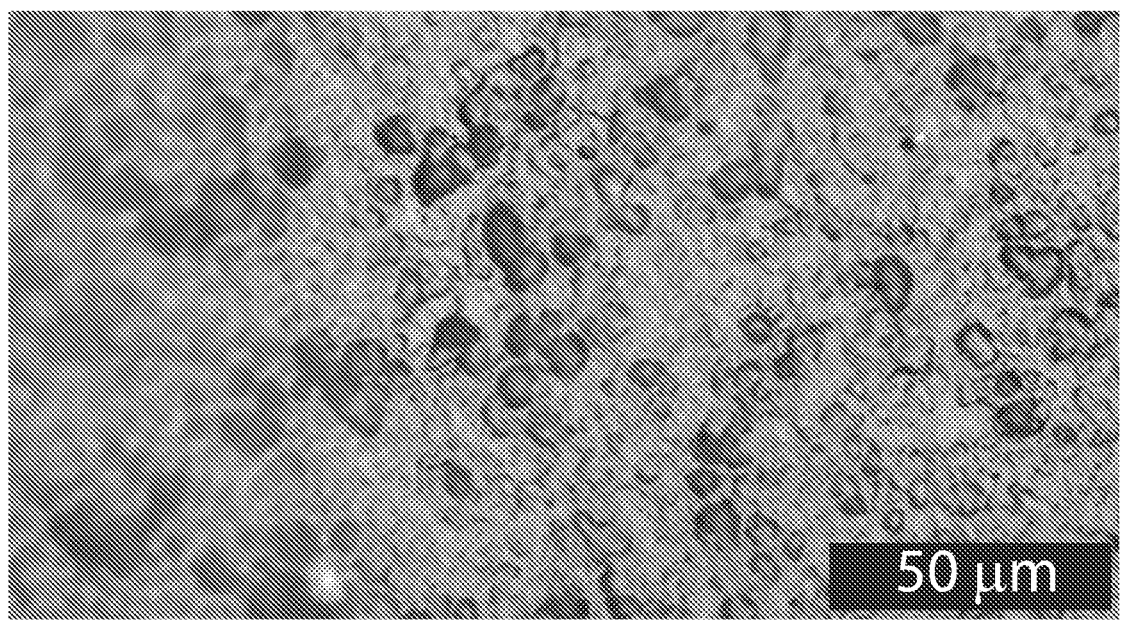
FIG. 11 illustrates a plan view of another embodied structured film.

FIGS. 10-11 depict magnified plan views of some illustrative films comprising a structured layer.

FIG. 10 can be characterized as comprising a plurality of peak structures, depicted in white, disposed on a grey base film layer forming a pattern. The peak structures are pentagonal having an average length and width of about 0.75 mm in plan view and arranged in a repeating pattern.

FIG. 11 is an illustrative matte surface comprising a random pattern of peak microstructures, ranging in size from about 5 to 10 microns.

As illustrated by FIGS. 5-9 the structures of the structured film can have various shapes and sizes. The structures can be arranged in various regular or random patterns that may be repeating patterns or non-repeating patterns. Although the structured film are illustrated in black and white, the structured film can be of the same color, vary in darkness of the same color or may comprise various contrasting color combinations. In some embodiments, the structures and/or the base layer film comprise a decorative additive, such as glitter.

Another embodied film comprising a structured layer is a matte film. Matte films typically have lower transmission and higher haze values than equivalent gloss films. For example, the haze is generally at least 5%, 6%, 7%, 8%, 9%, or 10% as measured according to ASTM D1003. Further gloss surfaces typically have a gloss of at least 130 as measured according to ASTM D 2457-03 at 60°; whereas matte surfaces have a gloss of less than 120. The surface of a matte film can also be characterized by surface roughness. The average surface roughness Ra is typically at least 50, 75, 100 nm or greater.

There are several approaches for obtaining matte films. For example, a matte coating can be prepared by adding matte particles, such as described in U.S. Pat. No. 6,778,240. In this embodiment, the matte coating is typically applied to a film backing comprising a (meth)acrylic polymer and polyvinyl acetal polymer composition, as described herein. The structures comprise the matte particles and the base film layer comprises the (e.g. cured) polymeric binder of the coating. The (e.g. cured) polymeric binder may also comprise a (meth)acrylic polymer and polyvinyl acetal polymer composition, as described herein or other (e.g. free-radically) polymerizable composition, as previously described.

In yet another approach, the surface of the film can be roughened or textured to provide a matte surface. According to U.S. Pat. No. 5,820,957; "the textured surface of the anti-reflective film may be imparted by any of numerous texturing materials, surfaces, or methods. Non-limiting examples of texturing materials or surfaces include: films or liners having a matte finish, microembossed films, a microreplicated tool containing a desirable texturing pattern or template (such as described in WO2010/141345; incorporated herein by reference), a sleeve or belt, rolls such as metal or rubber rolls, or rubber-coated rolls."

In one embodiment, the matte surface can be imparted by polymerizing a composition comprising (meth)acrylate solvent monomer and polyvinyl acetal polymer composition while the composition is in contact with a liner having a matte structured surface.

Another illustrative film comprising a structured layer is a stem-well film, as further described in WO2017/112564; incorporated herein by reference.

With reference to FIG. 1, the structures 14 of the stem film can be characterized as "posts" each have a conical shape that is generally circular in cross section. The well film is a negative replication of the stem film.

The structures 14 may have various cross sectional shapes such as, for example, a circular shape, an oval shape, a square shape, a polygon shape such as a hexagon, etc. The structures 14 may be tapered as depicted in FIG. 1. A draft angle is the included angle between the side surfaces 146 and the z axis of the post structures 14. In some embodiments, the draft angle is no greater than 30°, 15°, 10°, 8°, or 5°. In some embodiments, the draft angle is at least 0.5, 1°, 2°, or 3°.

The posts 14 have a height "H" which is a longitudinal distance between the first end 17 and the second end 18 of the respective posts 14. The first and second ends 17 and 18 have a first end width "W1" and a second end width "W2", respectively. The first width "W1" and the second end width "W2" are representative lateral dimensions of the cross sections of the (e.g. post) structures 14 in the respective lateral planes. The structures 14 each have a tapered shape so that W1 is greater than the corresponding W2. The height of the structures 14 can range up to 500 microns, 800 microns, 1 mm or 2 mm. In some embodiments, the structures have a height ranging up to 10, 20, 30, 40, 50, or 100 microns. The average end width (W1+W2)/2 can be, for example, at least 5, 10, 20, 30, 40, or 50 microns. The average end width (W1+W2)/2 can be, for example, can range up to 200, 300, 400, or 500 microns and in some embodiments up to 1 mm.

An aspect ratio of the structures 14 can be defined as a ratio between an average longitudinal dimension (e.g., along the direction generally perpendicular to the film 10) and an average lateral dimension (e.g., along a lateral, in plane direction generally parallel to the film 10). The structures 14 have an aspect ratio that can be defined by H/((W1+W2)/2). In some embodiments, the aspect ratio H/((W1+W2)/2) can be, for example, 0.5 or more, 1 or more, or 2 or more. In some embodiments, the aspect ratio H/((W1+W2)/2) can be, for example, 10 or less, 8 or less, or 6 or less. In some embodiments, the aspect ratio H/((W1+W2)/2) can be between 0.5 and 6.

The array of structures 14 are arranged in two dimensions with columns and rows on the base 12. The structure 14 are discrete and separated with each other by continuous cavities 16 therebetween. A pin density of the post structures 14 is defined as the number of structures per area on the base 12. In some embodiments, the pin density can be 50 pins/inch$^2$ (ppi) or more, 100 ppi or more, 500 ppi or more, or 1000 ppi or more. The pin density can be 20,000 ppi or less, 10,000 ppi or less, 5000 ppi or less, or 3000 ppi or less. In some embodiments, the pin density can be between 100 and 10,000 ppi.

The film comprises a (meth)acrylic polymer and a polyvinyl acetal polymer composition. In some embodiments, the base film layer comprises a (meth)acrylic polymer and polyvinyl acetal polymer composition. In other embodiments, the structures comprises a (meth)acrylic polymer and polyvinyl acetal polymer composition. In another embodiments, both the structures and the base film layer comprise a (meth)acrylic polymer and a polyvinyl acetal polymer composition. In yet another embodiment, a first structured layer comprising peaks and valleys further comprises a filling material disposed in the valleys. In this embodiments, the base film layer and/or structures of the first structured layer and/or the filling material comprises a (meth)acrylic polymer and polyvinyl acetal polymer. When the first structured layer and the filling material both comprise a (meth)acrylic polymer and a polyvinyl acetal polymer composition, the compositions are typically different. For example, the first structured layer may be opaque by inclusion of sufficient filler and/or pigment; whereas the filling material may be transparent. In yet other embodiments, the base film layer is disposed on a backing. In this embodiments, the backing may comprise a (meth)acrylic polymer and polyvinyl acetal polymer composition.

In the forthcoming discuss, the term "film" refers to the particular layer or layers, i.e. base film layer, structure, filling material, or backing film or layers that comprise the (meth)acrylic polymer and polyvinyl acetal polymer composition.

The film comprises polymerized units of one or more (meth)acrylate ester monomers derived from a (e.g. non-tertiary) alcohol containing 1 to 14 carbon atoms and preferably an average of 4 to 12 carbon atoms Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The film comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than –5° C., or no greater than –10° C. The Tg of these homopolymers is often greater than or equal to –80° C., greater than or equal to –70° C., greater than or equal to –60° C., or greater than or equal to –50° C.

The low Tg monomer may have the formula
wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the film comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, -and lauryl (meth)acrylate. In some embodiments, the monomer is an ester of (meth)acrylic acid with an alcohol derived from a renewable source, such as 2-octyl (meth)acrylate.

The film typically comprises at least 10, 15, 20 or 25 wt.-% of polymerized units of monofunctional alkyl (meth)acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) polymer, and crosslinker when present. The film typically comprises no greater than 60, 55, 50, 45, or 40 wt.-% of polymerized units of monofunctional alkyl (meth)acrylate monomer having a Tg of less than 0° C., based on the total weight of the polymerized units.

In other embodiments, the film (e.g. structures and/or filling material) comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

When the film is free of unpolymerized components such as inorganic filler and additives, the wt.-% of specified polymerized units is approximately the same as the wt.-% of such polymerized units present in the total composition. However, when the composition comprises unpolymerized components, such as inorganic filler or other unpolymerizable additive the total composition can comprise substantially less polymerized units. In general, the total amount of unpolymerizable additives may range up to 25 wt.-%. Thus, in the case of films comprising such unpolymerizable additives the concentration of specified polymerized units can be as much as 5, 10, 15, 20, 25 wt.-% less, depending on the total concentration of such additives. For example, when the film comprises 20 wt.-% inorganic filler, the concentration of low Tg monofunctional alkyl (meth)acrylate monomer may be 20% less, i.e. at least 8 wt.-%, 12 wt.-% etc.

The film generally comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In typical embodiments, the film comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the film comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the film comprises no greater than 30, 25, 20, or 10 wt.-% of polymerized units of high Tg monofunctional alkyl (meth)acrylate monomer. Further, in some embodiments, the film comprises less than 1.0, 0.5, 0.1 wt.-% or is free of polymerized units of high Tg monofunctional alkyl (meth) acrylate monomer.

In other embodiments, the film, (e.g. structures and/or filling material) comprises greater than 40 wt.-% of polymerized units of a monofunctional alkyl (meth)acrylate monomer having a Tg greater than 40° C. based on the total weight of the polymerized units of the (meth)acrylic polymer, polyvinyl acetal (e.g. butyral) polymer, and crosslinker when present. For example, the maximum concentration of polymerized units of a monofunctional alkyl (meth)acrylate monomer having a Tg greater than 40° C. may be 50, 60, 70, 80, or 90 wt.-%.

The Tg of the homopolymer of various monomers is known and is reported in various handbooks. The Tg of some illustrative monomers is also reported in PCT Application No. PCT/US2015/64215, filed Dec. 7, 2015; incorporated herein by reference In typical embodiments, the film further comprises at least 10, 15 or 20 wt.-% and no greater than 65 wt.-% of polymerized units of polar monomers. Such polar monomers generally aids in compatibilizing the polyvinyl acetal (e.g. butyral) polymer with the high and low Tg alkyl (meth) acrylate solvent monomers. The polar monomers typically have a Tg greater than 0° C., yet the Tg may be less than the high Tg monofunctional alkyl (meth)acrylate monomer.

Representative polar monomers include for example acid-functional monomers, hydroxyl functional monomers, nitrogen-containing monomers, and combinations thereof.

In some embodiments, the film comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the film comprises 0.5 up to 20 or 25 wt.-% of polymerized units of acid functional monomers, such as acrylic acid. In some embodiments, the film composition comprises at least 1, 2, 3, 4, or 5 wt.-% of polymerized units of acid-functional monomers. In other embodiments, the film composition comprises less than 1.0, 0.5, 0.1 wt.-% or is free of polymerized units of acid-functional monomers.

In some embodiments, the film comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the film comprises at least 0.5, 1, 2, 3, 4, or 5 wt.-% of polymerized units of nitrogen-containing monomers and typically no greater than 25 or 30 wt.-%. In other embodiments, film comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth) acrylate, 2-(methoxyethoxy)ethyl, 2-methoxyethyl methacrylate, and polyethylene glycol mono(meth)acrylates.

In some embodiments, the film comprises at least 0.5, 1, 2, 3, 4, or 5 wt.-% of polymerized units of alkoxy-functional (meth)acrylate monomers and typically no greater than 30 or 35 wt.-%. In other embodiments, the film comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The film generally comprises polymerized units of polar monomer in an amount of at least 10, 15 or 20 wt.-% and typically no greater than 65, 60, 55, 50 or 45 wt.-%.

The film may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the film comprises at least 0.5, 1, 2, 3, 4, or 5 wt.-% and typically no greater than 10 wt.-% of polymerized units of vinyl monomers. In other embodiments, the film comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the solvent monomer(s) are polymerized to form a random (meth)acrylic polymer copolymer.

The polyvinyl acetal polymer utilized in the present invention is obtained, for example, by reacting polyvinyl alcohol with aldehyde, as known in the art and described in greater detail in previously cited PCT/US2015/64215, filed Dec. 7, 2015. The polyvinyl acetal polymer is typically a random copolymer. However, block copolymer and tapered block copolymer may provide similar benefits as random copolymers.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer. In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%.

In some embodiments, the alkyl residue of aldehyde comprises 1 to 7 carbon atoms. In other embodiments, the alkyl reside of the aldhehyde comprises 3 to 7 carbon atoms such as in the case of butylaldehyde ($R_1$=3), hexylaldehyde ($R_1$=5), n-octylaldehyde ($R_1$=7). Of these butylaldehyde, also known as butanal is most commonly utilized. Polyvinyl butyral ("PVB") polymer is commercially available from Kuraray under the trade designation "Mowital™" and Solutia under the trade designation "Butvar™".

In some embodiments, the polyvinyl acetal (e.g. butyral) polymer has a Tg ranging from about 60° C. up to about 75° C. or 80° C. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in the film in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the film in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the film comprises 5 to 30 wt.-% of polyvinyl acetal polymer such as polyvinyl butyral based on the total weight of the polymerized units of the (meth)acrylate polymer, polyvinyl acetal (e.g. butyral) polymer, and crosslinker when present. In some embodiments, the film comprises at least 10, 11, 12, 13, 14, or 15 wt.-% of polyvinyl acetal (e.g. PVB) polymer. In some embodiments, the film comprises no greater than 25 or 20 wt.-% of polyyinyl acetal (e.g. PVB) polymer. When the film comprises a polyvinyl acetal (e.g. PVB) polymer having an average molecular weight (Mw) less than 50,000 g/mole, the film may comprise higher concentration polyvinyl acetal (e.g. PVB) polymer such as 35 or 40 wt.-%. Thus, the film and composition typically comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

In other embodiments, the film, (e.g. structures and/or filling material) comprises less than 5 wt.-% of polyvinyl acetal (e.g. butyral) polymer based on the total weight of the polymerized units of the (meth)acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 1.5, 3, 3.5, 4, or 4.5 wt.-%

In some embodiments, the film comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. C3-C20 olefin groups); as well as chlorinated triazine crosslinking compounds.

Examples of useful (e.g. aliphatic) multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula

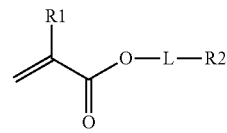

R1 is H or $CH_3$,
L is an optional linking group; and
R2 is an olefin group, the olefin group being optionally substituted.

Dihydrocyclopentadienyl acrylate is one example of this class of crosslinking monomer. Other crosslinking monomers of this type comprising a $C_6$-$C_{20}$ olefin are described in WO2014/172185.

In other embodiments, the crosslinking monomer comprises at least two terminal groups selected from allyl, methallyl, or combinations thereof. An allyl group has the structural formula $H_2C=CH—CH_2—$. It consists of a methylene bridge ($—CH_2—$) attached to a vinyl group ($—CH=CH_2$). Similarly, a methallyl group is a substituent with the structural formula $H_2C=C(CH_3)—CH_2—$. The terminology (meth)allyl includes both allyl and methallyl groups. Crosslinking monomers of this types are described in PCT Publication WO2015/157350.

In some embodiments, the film may comprise a multifunctional crosslinker comprising vinyl groups, such as in the case of 1,3-divinyl tetramethyl disiloxane.

The triazine crosslinking compound may have the formula.

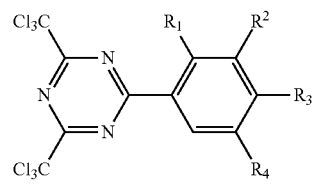

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5 or 10 wt.-% based on the total weight of the polymerized units of the (meth)acrylate polymer, polyvinyl acetal (e.g. butyral) polymer, and crosslinker. Thus, the film comprises such amount of polymerized crosslinker units.

In other embodiments, the film, (e.g. structures and/or filling material) comprises greater than 10 wt.-% of polymerized crosslinker units based on the total weight of the polymerized units of the (meth)acrylic polymer, polyvinyl acetal (e.g. butyral) polymer, and crosslinker when present. For example, the maximum concentration of polymerized crosslinker units may range up to 50, 55, 60, 65, 70, 75 or 80 wt.-%

The film can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the film comprises zero or no greater than 10, 9, 8, 7, 6, 5, 4, 3, 2, or 1 wt.-% of polymerized units of monomer having a methacrylate group. One method of preparing the film described herein comprises dissolving the polyvinyl acetal (e.g. PVB) polymer in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s).

The polyvinyl acetal (e.g. PVB) polymer can be added prior to and/or after partial polymerization of monomer(s) of the (meth)acrylic polymer. In this embodiment, the coatable composition comprises partially polymerized (e.g. alkyl (meth)acrylate) solvent monomers and polyvinyl acetal (e.g. PVB) polymer polymer. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate such as a release liner, and polymerized by exposure to radiation.

The method can form a higher molecular weight (meth) acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the composition can be increased even further by the inclusion of crosslinker.

The high molecular weight (meth)acrylic polymer as well as the film typically has a gel content (as measured according to the Gel Content Test Method described in the examples of PCT Application No. PCT/US2015/64215, filed Dec. 7, 2015 utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the film and coatable composition can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime; mono- or bis-acrylphosphine oxides such as IRGANOX 819 or LUCIRIN TPO Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt.-%. Relatively thick coatings can be achieved when the extinction coefficient of the photoinitiator is low.

The composition of the base film layer, structures, and/or backing can be coated on a structured or unstructured release liner using conventional coating techniques. For example, these compositions can be applied by methods such as roller coating, flow coating, dip coating, spin coating, spray coating knife coating, and die coating. Coating thicknesses may vary. The composition may be of any desirable concentration for subsequent coating, but is typically 5 to 30, 35 or 40 wt.-% polyvinyl acetal polymer solids in (meth)acrylic solvent monomer. The desired concentration may be achieved by further dilution of the coatable composition. The coating thickness may vary depending on the desired thickness of the (e.g. radiation) cured film.

The coated a (e.g. structured) release liner may be brought in contact with a base film layer or backing, as previously described, prior to curing.

The film composition and the photoinitiator may be irradiated with activating UV radiation having a UVA maximum in the wavelength range of 280 to 425 nanometers to polymerize the monomer component(s). UV light sources can be of various types. Low light intensity sources, such as blacklights, generally provide intensities ranging from 0.1 or 0.5 mW/cm$^2$ (millwatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, the base film layer is transparent having a transmission of visible light of at least 90 percent. In some embodiments, the base film layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in the examples. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

In other embodiments, the base film layer may be opaque (e.g. white) or reflective.

The film may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total film composition. In other embodiments, the concentration of additive can range up to 40, 45, 50, 55 or about 65 wt.-% of the total film composition.

In some embodiments, the film is free of plasticizer, tackifier and combinations thereof. In other embodiments, the film composition comprise plasticizer, tackifier and combinations thereof in amount no greater than 5, 4, 3, 2, or 1 wt.-% of the total composition. From the standpoint of tensile strength, it is preferable not to add a large amount of tackifier or plasticizer.

In some embodiments, the film composition comprises fumed silica. The concentration of (e.g. fumed) silica can vary. In some embodiments, the film composition comprises at least 0.5 or 1.0 wt.-% of (e.g. fumed) silica.

The film can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the film and composition described refers to the midpoint Tg as measured by Differential Scanning Calorimetry, (DSC), according to the test method described in previously cited PCT Application No. PCT/US2015/64215, filed Dec. 7, 2015. When the film and (e.g. radiation) cured composition comprises a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the film and (e.g. radiation) cured composition is generally at least 20, 25, or 30° C. ranging up to 55, 56, 57, 58, 59, or 60° C. In some embodiments, the Tg of the film is at least 31, 32, 33, 34, or 35° C. In other embodiments, the Tg of the film is at least 36, 37, 38, 39, or 40° C. In yet other embodiments, the Tg of the film is at least 41, 42, 43, 44, or 45° C. In some embodiments, the film exhibits a single Tg as measured by DSC. Thus, the polymerized (meth)acrylic polymer and polyvinyl acetal polymer composition alone or in combination with crosslinker can exhibit a single Tg.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single (e.g. continuous) phase. Alternatively, the film or (e.g. radiation) cured composition can be tested by transmission electron microscopy (TEM) according to the test method described in cofiled U.S. patent application Ser. No. 15/175,458. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns. An average dispersion size of less than 0.1 microns can also provide films having a low haze and high transmission.

The film can be characterized by tensile and elongation according to the test method described in PCT/US2015/64215, filed Dec. 7, 2015. The tensile and elongation properties typically pertain to the base film layer, the backing, or the entire film. In some embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or 300% and greater. In some embodiments, the elongation is at least 50, 100, 150, or 175% and may range up to 225, 250, 275, or 300%.

The film is preferably non-tacky to the touch at room temperature (25° C.) and preferably at (e.g. storage or shipping) temperatures ranging up to (120° F.) 50° C. In some embodiments, the films may exhibit a low level of adhesion to glass. For example, the 180° peel values can be about 2 oz/inch or less at a 12 inch/minute peel rate.

The "Dahlquist Criterion for Tack" is widely recognized as a necessary condition of a pressure sensitive adhesives (PSA). It states that a PSA has a shear storage modulus (G') of less than $3 \times 10^6$ dyne/cm$^2$ (0.3 MPa) at approximately room temperature (25° C.) and a frequency of 1 Hz (Pocius, Adhesion and Adhesive Technology 3$^{rd}$ Ed., 2012, p. 288).

A shear storage modulus can be converted to a tensile storage modulus using the following equation: E'=2G'(r+1), where r is Poisson's ratio for the relevant material. Using this equation and given that Poisson's ratio of elastomers and PSAs is close to 0.5, the Dahlquist Criterion expressed as a tensile storage modulus (E') is less than 0.9 MPa ($9 \times 10^6$ dyne/cm$^2$).

The film and base film layer described herein generally have a tensile storage modulus (E') at 25° C. of greater than $9 \times 10^6$ dynes/cm$^2$ at 1 Hz as can be measure by dynamic mechanical analysis (as determined by the test method described in the examples). The tensile storage modulus (E') at 25° C. is usually greater than $1 \times 10^7$ dynes/cm$^2$ (1 MPa), $5 \times 10^7$ dynes/cm$^2$, $1 \times 10^8$ dynes/cm$^2$, $5 \times 10^8$ dynes/cm$^2$, $1 \times 10^9$ dynes/cm$^2$, $5 \times 10^9$ dynes/cm$^2$, or $1 \times 10^{10}$ dynes/cm$^2$ (i.e. 1000 MPa) at 1 Hz. Thus, the film and composition is not a pressure sensitive adhesive in accordance with the Dahlquist criteria.

As depicted in FIG. 3, in some embodiments, the structured film further comprises a (e.g. pressure sensitive) adhesive layer 60 disposed on the opposite surface 31 of the base film layer 32 or backing when present.

The adhesive layer may be any suitable adhesive. Non-limiting examples of adhesives include pressure sensitive adhesives, heat activated adhesives, radiation curable adhesives, and the like. Examples of formulation types include solvent-based solutions, water-based latex, microspheres, hot melt coatable, and suitable combinations thereof.

Adhesive layer may comprise further layers, such as primer layers to enhance the bond between the adhesive layer and the film layer. The type of primer will vary with the type of film and adhesive used and one skilled in the art can select an appropriate primer. Examples of suitable primers include chlorinated polyolefins, polyamides, and modified polymers disclosed in U.S. Pat. Nos. 5,677,376, 5,623,010 and those disclosed in WO 98/15601 and WO 99/03907, and other modified acrylic polymers. Typically, primers are dispersed into a solvent at very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof.

The pressures sensitive adhesive (PSA) may be any type of PSA such as those described in the *Handbook of Pressure-Sensitive Adhesives*, Ed. D. Satas, 2 nd Edition, Von Nostrand Reinhold, N.Y., 1989. Classes of useful pressure sensitive adhesives include, for example, rubber resin materials such as tackified natural rubbers or those based on synthetic rubbers, styrene block copolymers, polyvinyl ethers, acrylics (including both acrylates and methacrylates), polyurethanes, poly-alpha-olefins, silicone resins, and the like. Combinations of these adhesives can be used. Additionally, further useful adhesives include those that may be activated at elevated temperature for application at use temperature. These generally meet the Dahlquist criterion at use temperature.

The pressure sensitive adhesive may be inherently tacky. If desirable, tackifiers may be added to a pressure sensitive adhesive base material to form the pressure sensitive adhesive. Useful tackifiers include, for example, rosin ester resins, aromatic hydrocarbon resins, aliphatic hydrocarbon resins, mixed aromatic/aliphatic hydrocarbon resins, and terpene resins. Other materials can be added for special purposes, including, for example, oils, plasticizers, antioxidants, ultraviolet ("UV") stabilizers, hydrogenated butyl rubber, pigments, fillers, curing agents, and crosslinkers. Some examples of fillers or pigments include zinc oxide, titanium dioxide, silica, carbon black, metal powders and calcium carbonate.

The adhesive layer may be applied using any conventional technique known to those skilled in the art. For example, the adhesive layer can be applied onto the film surface by coating, using for example a rotary rod die, slit die or gravure roll, or extrusion coating with conventional coating weights (e.g. 0.0004 to 0.008 g/cm2). The application of the adhesive layer may also be achieved by laminating the film with an adhesive layer, optionally covered by a release liner. When a release liner is used, the adhesive is either coated on the liner and laminated to the film or coated on the film and the release liner subsequently applied to the adhesive layer. The adhesive layer may be applied as a continuous layer, or a patterned, discontinuous layer. The adhesive layer typically has a thickness of about 5 to about 50 micrometers.

Examples of adhesives include PSA's, hot melt or heat activated adhesives that are the pressure sensitive at the time of application such as pressure sensitive adhesives disclosed in U.S. Pat. No. 4,994,322 (Delgado et al), U.S. Pat. No. 4,968,562 (Delgado), EP 0 570 515, and EP 0 617 708; and the pressure sensitive adhesives disclosed in U.S. Pat. Nos. 5,296,277 and 5,362,516 (both Wilson et al) and U.S. Pat. No. 5,141,790 (Calhoun et al) and WO 96/1687 (Keller et al.) Other examples of PSA's are described in U.S. Pat. No. Re 24,906 (Ulrich), U.S. Pat. No. 4,833,179 (Young et al), U.S. Pat. No. 5,209,971 (Babu et al), U.S. Pat. No. 2,736, 721 (Dester), and U.S. Pat. No. 5,461,134 (Leir et al). Acrylate-based PSA's include those described in U.S. Pat. No. 4,181,752 (Clemens et al) and U.S. Pat. No. 4,418,120 (Kealy et al), WO 95/13331. In one embodiment, the heat activatable adhesive also comprises (meth)acrylic polymer and polyvinyl acetal resin, as described in WO 16/094280.

In some embodiments, the adhesive layer is a repositionable adhesive layer. The term "repositionable" refers to the ability to be, at least initially, repeatedly adhered to and removed from a substrate without substantial loss of adhesion capability. A repositionable adhesive usually has a peel strength, at least initially, to the substrate surface lower than that for a conventional aggressively tacky PSA. Suitable repositionable adhesives include the adhesive types used on CONTROLTAC Plus Film brand and on SCOTCHLITE Plus Sheeting brand, both made by Minnesota Mining and Manufacturing Company, St. Paul, Minn., USA.

The adhesive layer may also be a structured adhesive layer or an adhesive layer having at least one microstructured surface. Upon application of film article comprising such a structured adhesive layer to a substrate surface, a network of channels or the like exists between the film article and the substrate surface. The presence of such channels or the like allows air to pass laterally through the adhesive layer and thus allows air to escape from beneath the film article and the surface substrate during application.

Topologically structured adhesives may also be used to provide a repositionable adhesive. For example, relatively large scale embossing of an adhesive has been described to permanently reduce the pressure sensitive adhesive/substrate contact area and hence the bonding strength of the pressure sensitive adhesive. Various topologies include concave and convex V-grooves, diamonds, cups, hemispheres, cones, volcanoes and other three dimensional shapes all having top surface areas significantly smaller than the base surface of the adhesive layer. In general, these topologies provide adhesive sheets, films and tapes with lower peel adhesion values in comparison with smooth surfaced adhesive layers. In many cases, the topologically structured surface adhesives also display a slow build in adhesion with increasing contact time.

An adhesive layer having a microstructured adhesive surface may comprise a uniform distribution of adhesive or composite adhesive "pegs" over the functional portion of an adhesive surface and protruding outwardly from the adhesive surface. A film article comprising such an adhesive layer provides a sheet material that is repositionable when it is laid on a substrate surface (See U.S. Pat. No. 5,296,277). Such an adhesive layer also requires a coincident microstructured release liner to protect the adhesive pegs during storage and processing. The formation of the microstructured adhesive surface can be also achieved for example by coating the adhesive onto a release liner having a corresponding micro-embossed pattern or compressing the adhesive, e.g. a PSA, against a release liner having a corresponding micro-embossed pattern as described in WO 98/29516.

If desired, the adhesive layer may comprise multiple sub-layers of adhesives to give a combination adhesive layer assembly. For example, the adhesive layer may comprise a sub-layer of a hot-melt adhesive with a continuous or discontinuous overlayer of PSA or repositionable adhesive.

The adhesive layer may optionally be protected with a release liner. The release liner is preferably adhesive-repellant and more specifically comprises paper or film, which has been coated or modified with compounds of low surface energy relative to the adhesive applied. Organosilicone compounds, fluoropolymers, polyurethanes and polyolefins can serve this purpose. The release liner can also be a polymeric sheet produced from polyethylene, polypropylene, PVC, polyesters with or without the addition of adhesive-repellant compounds. As mentioned above, the release liner may have a microstructured or micro-embossed pattern for imparting a structure to the adhesive layer.

Alternatively the exposed surface of the film (e.g. structured layer or cured filling material) may be coated with a suitable release material, also referred to in the art as a low adhesive backsize (LAB). Release materials are known and include materials such as, for example, silicone, polyethylene, polycarbamate, polyacrylics, and the like.

In some embodiments, the adhesive is an acrylic heat activated adhesive or acrylic pressure sensitive adhesive. Such adhesives can comprise the same general components as the (meth) acrylic polymer of the film. However, the adhesives generally comprise different concentrations of such components. For example, the adhesives often comprise a higher concentration of polymerized units of low Tg alkyl monofunctional (meth)acrylate monomer and/or a sufficient concentration of tackifer to lower the Tg and the tensile elastic modulus. In one embodiment, the acrylic adhesive comprises at least 65, 70, 75, 80, 85 or 90 wt.-% of polymerized units of low Tg alkyl monofunctional (meth) acrylate monomer, as previously described. In some embodiments, the acrylic adhesive comprises at least 0.1, 0.5, 1, 2, 3, 4, 5, 6, 7, 8, 9, or 10 wt.-% of a polar monomer, such as an acid functional monomer. The maximum concentration of polar monomer is the same as previously described for the film. In some embodiments, the acrylic adhesive comprises at least 0.4, 1, 1.5 or 2 wt-% up to about 10 or 15 wt-% of polymerized crosslinker units. The crosslinker may comprise a (meth)acrylate group and an olefin group as previously described. Alternatively, the acrylic adhesive may comprise a small concentration, e.g. less than 1 wt.-% of a triazine crosslinker. In some embodiments, the acrylic adhesive comprises greater than 5, 10, or 15 wt-% of tackifier and typically no greater than 20, 30, 40, or 50 wt.-%. In typical embodiments, the adhesive does not comprise a polyvinyl acetal (e.g. butyral) resin.

In some embodiments, the film is a graphic film used to apply designs, e.g. images, graphics, text and/or information, on windows, buildings, pavements or vehicles such as autos, vans, buses, trucks, streetcars and the like for e.g. advertising or decorative purposes. Many of the surfaces, e.g. vehicles, are irregular and/or uneven.

In other embodiments, the film is a decorative tape.

In yet other embodiments, the film is a synthetic fabric such as synthetic leather.

Materials

| Designation | Description |
| --- | --- |
| EHA | 2-Ethylhexyl acrylate, available from BASF, Florham Park, NJ. |
| IBOA | Isobornyl acrylate, available from San Esters, New York, NY. |
| AA | Acrylic acid, available from BASF, Florham Park, NJ. |
| HDDA | Hexanediol Diacrylate, available from Sartomer Americas, Exton, PA. |
| HEA | 2-Hydroxyl ethyl acrylate, available from BASF, Florham Park, NJ. |
| IOA | Isooctyl acrylate, obtained from 3M Company, St. Paul, MN. |
| CN965 | An aliphatic polyester based urethane diacrylate oligomer available under the trade designation CN965 from Sartomer Americas, Exton, PA, |
| Irg 651 | 2,2-Dimethoxy-1,2-diphenylethan-1-one, available under the trade designation IRGACURE 651 from BASF Corporation, Vandalia, IL. |
| Irg 819 | Bis(2,4,6-trimethylbenzoyl)-phenylphosphineoxide, available under the trade designation IRGACURE 819 from BASF Corporation, Vandalia, IL. |
| Tin 479 | A hydroxyphenyl-triazine (HPT) UV absorber, available under the trade designation TINUVIN 479 from BASF Corporation, Vandalia, IL. |
| Tin 928 | A UV absorber of the hydroxyphenyl benzotriazole class, available under the trade designation TINUVIN 928 from BASF Corporation, Vandalia, IL. |

| Designation | Description |
|---|---|
| B60H | Poly(vinyl butyral) having a glass transition temperature (Tg) of 70° C., available under the trade designation MOWITAL B60H from Kuraray, Houston, TX. |
| White Pigment | A white pigment dispersion in phenoxyethyl acrylate, obtained as 9W1817 from Penn Color, Doylestown, PA. |
| Black Pigment 1 | A black pigment dispersion in phenoxyethyl acrylate, obtained as 9B117 from Penn Color, Doylestown, PA. |
| Black Pigment 2 | A black pigment dispersion in phenoxyethyl acrylate, obtained as PMX 4178 from Penn Color, Doylestown, PA. |
| Blue Pigment 1 | A readily dispersible blue pigment available under the trade name SHEPHERD 30C527 from Shepherd Color, Cincinnati, OH. |
| Blue Pigment 2 | A blue pigment dispersion in phenoxyethyl acrylate, obtained as 9S1494 from Penn Color, Doylestown, PA. |
| Red Pigment 1 | A red pigment, obtained under the trade designation NEOPOLAR BRILLIANT RED B from CIBA-GEIGY Corporation, Ardsley, NY. |
| Red Glitter | A red polyester jewel having a diameter of 0.006 inches (0.152 micrometers), available under the trade designation HEX FIRE RED from Meadowbrook Inventions, Newton, NJ. |
| PET 1 | An untreated clear, amorphous, copolyester film having a nominal thickness of 51 micrometers (0.002 inches). |
| PET 2 | A clear, amorphous, copolyester film having a nominal thickness of 13 micrometers (0.0005 inches), obtained from Eastman Chemical Company, Kingsport, TN. Prior to use this was corona treated under a nitrogen atmosphere at 500 milliJoules/square centimeter. |
| PET 3 | A silicone release liner having a nominal thickness of 51 micrometers (0.002 inches), obtained from Dupont Teijin, Dupont Chemical Company, Wilmington DE. |
| Textured Paper 1 | A textured release liner commercially available under the trade designation CARBON FIBER ULTRACAST from Sappi Warren Release Papers, Westbrook, ME. |
| Textured Paper 2 | A textured release liner commercially available under the trade designation BALLISTIC ULTRACAST from Sappi Warren Release Papers, Westbrook, ME. |
| Textured Paper 3 | A textured release liner commercially available under the trade designation HONEYCOMB ULTRACAST from Sappi Warren Release Papers, Westbrook, ME. |
| Textured Paper 4 | A textured release liner commercially available under the trade designation SPIRO ULTRACAST from Sappi Warren Release Papers, Westbrook, ME. |
| Textured Paper 5 | ULTRAMATTE ULTRACAST from Sappi Warren Release Papers, Westbrook, ME.). |
| 1080 CF 1 | A cast, 0.004 inch (90 micrometer) thick, poly(vinyl chloride) graphics film having a carbon fiber texture and metallic anthracite color and having a repositionable acrylic pressure sensitive adhesive covered with a paper release liner, available under the trade designation 3M WRAP FILM 1080-CF201 ANTHRACITE from 3M Company, St. Paul, MN. |
| 1080 CF 2 | A cast, 0.004 inch (90 micrometer) thick, poly(vinyl chloride) graphics film having a carbon fiber texture and white color and having a repositionable acrylic pressure sensitive adhesive covered with a paper release liner, available under the trade designation 3M WRAP FILM 1080-CF201 CARBON FIBER WHITE from 3M Company, St. Paul, MN. |
| BOPP 1 | A 0.0016 inch (41 micrometers) biaxially oriented polypropylene film which was corona treated under a nitrogen atmosphere at 500 milliJoules/square centimeter. |
| XP 2617 | A largely linear diisocyanate prepolymer based on hexamethylene diisocyanate and an ether diol, having an NCO content of 12.5 wt %, available under the trade designation DESMODUR XP 2617 from Bayer Material Science, Leverkusen, Germany. |
| PS90 | A water-based acrylic pressure sensitive adhesive available under the trade designation ROBOND PS90 from Dow Chemical Company, Midland, MI. |
| PETA | Acrylate Monomer, Pentaerythritol Tetracrylate, commercially available from Sigma-Aldrich, St. Louis, MO as "PETA 408263". |
| Ebec 8301-R | Acrylate Monomer, Aliphatic Urethane Hexaacrylate, commercially available from Allnex, Smyrna, GA as "EBECRYL 8301-R". |
| PL 100 | Photoinitiator, 70:30 blend of oligo [2-hydroxy-2-methyl-1-[4-(1-methylvinyl) phenyl] propanone] and 2-Hydroxy-2-methyl-1-phenyl-1-propanone, commercially available from Esstech, Inc., Essington, PA as "PL100" |

Curing of the Compositions

All the UVA cured films and adhesive compositions were cured by exposure a UVA light source having a UVA maximum in the range of 350-400 nanometers. The total UVA energy was determined using a POWERMAP radiometer equipped with low power sensing head (available from EIT Incorporated, Sterling, Va.). The radiometer web speed and energy were then used to calculate the total UVA energy. The radiometer web speed was also used to calculate the total exposure time.

Preparation of Base Syrups 1-2

Base Syrup 1 was prepared by mixing the components in the amounts shown in Table 1 below as follows. Acrylic monomers, crosslinker, ultra-violet absorbers (UVAs) and photoinitiator were combined in a 1 gallon (3.79 liters) glass jar and mixed using a high shear electric motor to provide a homogeneous mixture. Next, B60H was then added over a period of about three minutes with mixing. This was followed by further high speed mixing until a homogeneous, viscous solution was obtained. This was then degassed for ten minutes at a vacuum of 9.9 inches (252 millimeters) mercury. The XP 2617 was added to the syrup immediately prior to coating.

Base Syrup 2 was prepared in the same manner as Base Syrup 1 using the amounts shown in Table 1.

TABLE 1

Base Syrup Formulations (parts by weight)

| Base Syrup | EHA | IBOA | AA | HEA | CN965 | XP2617 | Irg 651 | Irg 819 | B60H | Tin 479 | Tin 928 |
|---|---|---|---|---|---|---|---|---|---|---|---|
| 1 | 29.46 | 8.19 | 20.18 | 20.18 | 2.58 | 2.58 | 0.32 | | 16.37 | 0.05 | 0.10 |
| 2 | 29.77 | 8.27 | 20.39 | 20.39 | 2.60 | 0 | 0 | 2.02 | 16.55 | 0 | 0 |

Preparation of Pigmented Syrups 1-3

Pigmented syrups were prepared by adding the desired amount of Base Syrup 2 to a 1 quart (0.95 liter) glass jar, followed by pigment, in parts per one hundred (pph) parts of base syrup, as shown in Table 2. The pigmented syrups were then mixed at 3,000 revolutions per minute (rpm) for 5 minutes using a 1.5 inch Cowles blade.

TABLE 2

Pigmented Syrup Formulations

| Syrup Identification | Pigment | Pigment Loading (pph) |
|---|---|---|
| Black Pigment Syrup 1 | Black Pigment 1 | 6 |
| Red Pigment Syrup 1 | Red Pigment 1 | 5 |
| Blue Pigment Syrup 1 | Blue Pigment 1 | 10 |

Films Comprising Structured PVC Film and Acrylic/PVB Filling Material

Example 1

Black Pigment Syrup 1 was squeegee coated onto the structured surface of 1080 CF2 (opposite the side having the pressure sensitive adhesive layer) and brought into intimate contact with PET 1. The syrup was cured by exposing the PET surface to UVA energy for 300 seconds such that the total UVA energy was 1800 milliJoules/square centimeter. The PET 1 was removed, giving a flexible film having a pressure sensitive adhesive on one outer surface, structured PVC in the middle and an acrylic/PVB film layer disposed on the structured PVC. The acrylic/PVB filled the valleys of the structured PVC film such that the outer exposed surface of the acrylic/PVB layer had a smooth, glossy surface. A photocopy of the same surface in black and white is depicted in FIG. 9. In this example the black structures were grey in color.

Example 2

Red Pigment Syrup 1 was squeegee coated onto the structured surface of 1080 CF1 (opposite the side having the pressure sensitive adhesive layer). This coated article was then further overcoated with Base Syrup 1 using a notch bar coater at a thickness of 0.002 inches (51 micrometers), and brought into intimate contact with PET 1. The syrup was cured by exposing the PET 1 surface to UVA as described in Example 1. The PET 1 was removed, giving a flexible film having a pressure sensitive adhesive on one outer surface, structured PVC in the middle and acrylic/PVB film layer disposed on the structured PVC. The acrylic/PVB filled the valleys of the structured PVC film such that the outer exposed surface of the acrylic/PVB layer had a smooth, glossy surface. A photocopy of the same surface in black and white is depicted in FIG. 9. In this example, the film was a two-toned metallic purple color Films Comprising Acrylic/PVB Base Film Layer and Structures Example 3

Black Pigment Syrup 1 was squeegee coated onto the surface of Textured Paper 1. This coated article was then further overcoated with Blue Pigment Syrup 1 using a notch bar coater at a thickness of 0.004 inches (102 micrometers), and brought into intimate contact with PET 1. The syrup was cured by exposing the PET 1 surface UVA energy as described in Example 1. The PET 1 liner was removed, giving a flexible, blue colored, acrylic/PVB film article having a structured surface on one side and a smooth surface on the opposite side.

Film Comprising Polypropylene Backing and Acrylic/PVB Base Film Layer and Structures Preparation of Base Syrups 3-4

Base Syrups 3-5 were prepared in the same manner as Base Syrup 1 using the amounts shown in Table 3.

TABLE 3

Base Syrup Formulations (parts by weight)

| Base Syrup | EHA | IBOA | AA | HEA | CN965:IBOA/1:1 | Irg 819 | B60H |
|---|---|---|---|---|---|---|---|
| 3 | 29.4 | 13.4 | 12.2 | 12.2 | 17.1 | 1.00 | 14.7 |
| 4 | 30.8 | 14.1 | 12.9 | 12.9 | 18.0 | 0.99 | 10.4 |

Preparation of Pigmented Syrups

Pigmented syrups were prepared by adding a Base Syrup to a 1 quart (0.95 liter) glass jar, followed by pigment, in parts per one hundred (pph) parts of base syrup, as shown in Table 4. The pigmented syrups were then mixed at 3,000 revolutions per minute (rpm) for 5 minutes using a 1.5 inches Cowles blade.

TABLE 4

Pigmented Syrup Formulations

| Syrup Identification | Base Syrup | Pigment | Pigment Loading (pph) |
|---|---|---|---|
| Black Pigment Syrup 2 | 3 | Black Pigment 2 | 3.0 |
| White Pigment Syrup 1 | 3 | White Pigment | 15 |
| Blue Pigment Syrup 2 | 3 | Blue Pigment 2 | 10 |
| White Pigment Syrup 2 | 5 | White Pigment | 10 |

Preparation of Glitter Syrup

Glitter syrup was prepared by adding a Base Syrup to a 1 quart (0.95 liter) glass jar, followed by glitter, in parts per one hundred (pph) parts of base syrup, as shown in Table 5. The glitter syrup was then mixed at 3,000 revolutions per minute (rpm) for 5 minutes using a 1.5 inches Cowles blade.

TABLE 5

Glitter Syrup Formulation

| Syrup Identification | Base Syrup | Glitter ID | Glitter Loading (pph) |
|---|---|---|---|
| Red Glitter Syrup | 4 | Red Glitter | 15 |

Example 4

Black Pigment Syrup 2 was coated between Textured Paper 2 and BOPP 1 using a two-roll coater having a gap setting of 0.002 inches (51 micrometers) greater than that combined thickness of the two liners. The syrup was cured by exposing the BOPP 1 surface to UVA energy for 228 seconds such that the total UVA energy was 912 milliJoules/square centimeter. Textured Paper 2 was removed, giving a two-layered, colored article having a structured exposed surface of the cured acrylic/PVB film. PS90 was then coated onto the exposed BOPP 1 surface using a notch bar coater at a thickness of 0.002 inches (51 micrometers) and dried at 70° C. for 15 minutes. A flexible, black colored, film article having a pressure sensitive adhesive on one outer surface, BOPP 1 backing in the middle, and a structured acrylic/PVB film layer on the other outer surface was obtained.

Film Comprising Acrylic/PVB Base Film Layer and Structures

Example 5

White Pigment Syrup 1 was coated at a thickness of 0.002 inches (51 micrometers) using a notch bar coater onto PET 2 and Blue Pigment Syrup 2 was squeegee coated onto Textured Paper 3. The two coated liners were brought into intimate contact using a two-roll coating station using a gap setting of 0.002 inches (51 micrometers) greater than the combined thickness of the uncoated liners. The syrup were cured by exposing the PET 2 surface to UVA energy for 288 seconds such that the total energy was 1368 milliJoules/square centimeter. Textured Paper 3 was removed to give a flexible, two-tone (white and blue) colored structured acrylic/PVB film article having a white base film layer, disposed on a PET 2 liner. A photocopy of the same surface in black and white is depicted in FIG. 8.

Film Comprising Polypropylene Backing and Acrylic/PVB Base Film Layer and Structures Example 6

White Pigment Syrup 2 was squeegee coated onto Textured Paper 4. The coated composition was partially cured by exposure to a total of 60 milliJoules/square centimeter of UVA energy in a nitrogen-inerted environment. Following irradiation the partially cured syrup surface was coated with Red Glitter Syrup and was covered with BOPP 1 using a two-roll coating station having a gap setting of 0.002 inches (51 micrometers) greater than the combined thickness of the BOPP 1 and coated Textured Paper 4. The syrups was then cured by exposing the BOPP 1 surface to a total was 1368 milliJoules/square centimeter of UVA energy. PS90 was then coated onto the exposed BOPP 1 surface using a notch bar coater at a thickness of 0.002 inches (51 micrometers) and dried at 70° C. for 15 minutes. A flexible film was produced comprising a structured acrylic/PVB two-tone (red and white) surface disposed on a BOPP 1 backing wherein the opposing surface of the backing had an adhesive layer. A photocopy of the same surface in black and white is depicted in FIG. 6.

Example 7—Matte Film

Adhesive Syrup 1

Adhesive Syrup 1 was prepared by charging a one quart (0.95 liters) jar with 325.5 grams EHA, 24.5 grams AA, 14.0 grams DPA and 0.14 grams Irg 651, and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UVA light until a pre-adhesive syrup having a viscosity deemed suitable for coating was formed. Following UV exposure, air was introduced into the jar. Following prepolymerization, 0.16 pph Irgacure 651 and 2.5 pph Wacker H15 FS was mixed into the syrup by shear mixing for 3 minutes at 3000 rpm and rolling overnight.

A Base Syrup was coated using a notch bar coater at a thickness of 0.003 inches (76 micrometers) onto Textured Paper 5 (A textured release liner commercially available under the trade designation ULTRAMATTE ULTRACAST from Sappi Warren Release Papers, Westbrook, Me.). The syrup was partially cured by exposure to a total of 90 milliJoules/square centimeter of UVA energy in a nitrogen-inerted environment. Following irradiation, the unstructured acrylic/PVB film surface was coated with Adhesive Syrup 1 using a notch bar coater at a thickness of 0.002 inches (51 micrometers) and exposed to a total of 958 milliJoules/square centimeter of UVA energy in a nitrogen-inerted environment. A matte structured film having a PSA on one side and a matte structured acrylic/PVB film on the opposite side was obtained.

(LAB) Escoat P-20 Liquid (Mayzo Inc, Suwanee, Ga.) was applied to the structured surface of Example 6 in a thin layer using a cloth applicator. The sample was placed in an oven at 70° C. for 2 minutes to complete drying.

Example 8—Acrylic/PVB Backing with Structured Acrylic Layer

Composition A

| EHA | IBOA | CN965 | HDDA | Irg 819 |
|---|---|---|---|---|
| 20.65% | 23.60% | 14.75% | 40.00% | 1.00% |

Composition B

| EHA | IBOA | CN965 | HDDA | Irg 819 |
|---|---|---|---|---|
| 34.65% | 39.60% | 24.75% | 0.00% | 1.00% |

Composition A and B were coated using a notch bar coater at a thickness of 0.0005 inches (12.7 micrometers) onto Textured Paper 2. The coated composition was exposed to UV-A as previously described except that the total energy was 1028 milliJoules/square centimeter and exposed surface of the composition was in a nitrogen-inerted environment. Following irradiation, the unstructured acrylic/PVB film surface was coated with Base Syrup 2 using a notch bar coater at a thickness of 0.002 inches (51 micrometers) and exposed to a UV-A energy as previously describe except that the total energy was of 1542 milliJoules/square centimeter. A structured film having a acrylic/PVB film on one side and a structured acrylic film without PVB on the opposite side was obtained.

Example 9 Stem Film Comprising Acrylic/PVB Film Layer and Structures

A polypropylene stem film having a total thickness of approximately 381 micrometers was produced by a molding process. The stem film included an array of conical posts having a height of 270 micrometers, a radius at the base of 100 micrometers, and a radius at the apex 85 micrometers, with a generally flat top.

A Base Syrup was coated between Stem Film 1 and PET 1 using a notch bar coater at a total gap setting of 0.020 inches (508 micrometers). The syrup was cured by exposure to UVA in a nitrogen-inerted environment for 30 seconds such that the total energy was 675 milliJoules/square centimeter. Upon removal of Stem Film 1 and PET 1 an acrylic/PVB film having wells therein was obtained. The wells each had a depth of approximately 270 micrometers and a volume of about 7.27 nanoliters.

Example 10 Acrylic/PVB Film Layer Comprising Acrylic Structures

The acrylic/PVB film was prepared from the following composition:

| EHA | IBOA | AA | HEA | CN965 | B60H | Irg 651 |
|---|---|---|---|---|---|---|
| 23.39 | 20.44 | 11.41 | 11.41 | 7.96 | 19.25 | 0.5 |

A hardcoat composition was also prepared from the following components in the amounts indicated in the following table

| Ebec 8301-R | HDDA | PETA | PL 100 |
|---|---|---|---|
| 49.5 | 24.75 | 24.75 | 1 |

To prepare the acrylic/PVB film the components were combined utilizing a MAX 20 WHITE SPEEDMIXER (available from FleckTek, Inc., Landrum, S.C.) and mixed at 3500 RPM for 2 minutes. The mixture was degassed at −20 inches of mercury (−6.8 kPa) for 5 minutes.

The mixture was coated at a thickness of 2.0 mils between untreated PET liners and exposed to UVA light. The total energy was measured using a Powermap™ radiometer equipped with a low intensity sensing head (available from EIT Inc., Sterling, Va.) and was 1824 mJ/cm$^2$ for this example.

Hardcoat structures were prepared by printing the hardcoat composition on the aforementioned acrylic/PVB cured film using a FLEXI-PROOFER Flexographic printing unit (Weller Patents Development, Putney, London England). Cyrel™ DPR photopolymer print plate from SGS International was used to apply the hardcoat composition. The features on the stamp were designed to provide regions of discrete patterned material. The stamp had (60 micron by 60 micron) square features with a pitch of 120 microns and a height of 1-2 microns. After printing, the samples were cured in a LIGHTHAMMER 6 UV curing system with a D bulb (Heraeus Noblelight Fusion UV Inc., Gaithersburg, Md.). Curing took place at 100% power and 25 ft/min (7.6 m/min), 1 pass.

The morphology, transmission, haze, and clarity of a representative film, the acrylic/PVB film of Example 10 without the hardcoat structures, was evaluated using the test methods described below. The test results are as follows:

| Ex. | Transmission | Haze | Clarity | Morphology by TEM Analysis |
|---|---|---|---|---|
| 10 | 94.6 | 8.2 | 90.4 | Single phase |

Transmission, Haze and Clarity were measured using a BYK Haze-gard plus, CAT #4725.

Morphology Characterization by Transmission Electron Microscopy (TEM)

Analytical characterization of the sample morphology was carried out by transmission electron microscopy (TEM). All the film samples were imaged in cross-section.

Sample Preparation

The film samples were prepared using room-temperature ultramicrotomy as follows: 1) roughly ¼" by ½" sections were cut from the film samples using a scalpel blade. These sections were embedded in Scotchcast #5 electrical resin. The embedded samples were allowed to room-temperature cure overnight; 2) thin slices of the embedded film (in cross-section) were cut by ultramicrotomy (Leica FC7) using a diamond knife. Slice thickness varied from 110 nm to 150 nm, depending on the sample. Cutting speed was 0.15 mm/sec; 3) the thin slices were floated onto distilled/deionized water, and then collected onto a standard TEM sample grid: A carbon/formvar film supported on a 3 mm diameter, 150 mesh Cu grid.

Imaging

The prepared thin sections were imaged by TEM (FEI Osiris, 200 kv field emission TEM). Magnification range was from 450× to 20,000× (instrument magnification). Various imaging modes were employed to characterize the morphology. They are briefly described below:

TEM: Conventional Transmission Electron Microscopy is a microscopy technique in which a beam of electrons is transmitted through an ultra-thin specimen, in this case 110-150 nm, interacting with the specimen as it is transmitted through. An image is formed as a result of the electron/sample interactions. At the lower magnifications used here, TEM image contrast is primarily due to the variations in the thickness, structure and composition in the material.

STEM: Scanning Transmission Electron Microscopy. An alternate mode of imaging in the TEM: In this case the electron beam is rastered in much the same way as in an SEM image, but with a significantly smaller probe size. Probe size for this imaging mode ranges from 0.5 nm to 5 nm.

HAADF: High Angle Annular Dark Field imaging mode. HAADF images are formed by collecting the scattered (vs. transmitted) electrons with an annular dark-field detector. The high angle, incoherently scattered electrons which form the image are highly sensitive to variations in the average atomic number, thus the contrast in these images is compositionally sensitive. The HAADF imaging mode is also known as Z-contrast imaging.

What is claimed is:

1. A film comprising a (meth)acrylic polymer and 5 to 30 wt.-% polyvinyl acetal polymer composition,
wherein the (meth)acrylic polymer and the polyvinyl acetal polymer composition comprises polymerized units of monofunctional alkyl (meth)acrylate monomer(s) having a glass transition temperature (Tg) of less than 0° C. and at least 10 wt. % and no greater than 65 wt. % of polymerized units of polar monomer(s) such that the (meth)acrylic polymer and the polyvinyl acetal composition has a single glass transition temperature (Tg) ranging from 20° C. to 60° C. as measured by Differential Scanning calorimetry, and the polyvinyl acetal polymer comprises polymerized units having the following formula

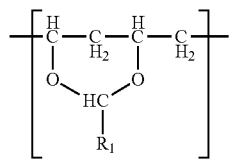

wherein $R_1$ is hydrogen or a C1-C7 alkyl group; and the film comprises a structured layer.

2. The film of claim 1 wherein the structured layer comprises a base film layer and structures disposed on a major surface of the base film layer, wherein the base film layer or the structures comprise the (meth)acrylic polymer and the polyvinyl acetal polymer composition.

3. The film of claim 2 wherein the base film layer is not integral with the structures.

4. The film of claim 1 wherein the structured layer comprises a base film layer, structures comprising peaks and valleys disposed on a major surface of the base film layer, and a filling material at least partially filling the valleys; wherein the base film layer, the structures, or the filling material comprise the (meth)acrylic polymer and the polyvinyl acetal polymer composition.

5. The film of claim 4 wherein at least one of the base film layer, the structures, or the filling material comprises a colorant, an opacifying agent, a decorative additive, a filler or a combination thereof.

6. The film of claim 1 wherein the structured layer comprises a base film layer and structures disposed on a major surface of the base film layer, wherein the base film layer and structures of the structured layer comprise the (meth)acrylic polymer and the polyvinyl acetal polymer composition.

7. The film of claim 6 wherein the base film layer is integral with the structures.

8. The film of claim 6 where the film comprises a backing proximate the base film layer.

9. The film of claim 3 wherein the backing comprises the (meth)acrylic polymer and the polyvinyl acetal polymer composition.

10. The film of claim 8 wherein the base film layer comprises the (meth)acrylic polymer and the polyvinyl acetal polymer composition and the backing comprises a substrate selected from polymeric films, woven or nonwoven fabrics, metal foils, foams, paper, and combinations thereof.

11. The film of claim 8 wherein the base film layer and/or the backing is a conformable polymeric film.

12. The film of claim 8 further comprising as adhesive layer disposed on the opposing surface of the base film layer or the backing.

13. The film of claim 12 wherein the adhesive layer is a structured pressure sensitive adhesive layer.

14. The film of claim 6 wherein the structures form a decorative pattern.

15. The film of claim 6 wherein the structures provide a matte surface.

16. The film of claim 1 further comprising a release coating disposed on an outer exposed surface of the film.

17. The film of claim 1 wherein the (meth)acrylic polymer has a gel content such that the (meth)acrylic polymer is not thermoplastic.

18. The film of claim 1 wherein the polar monomers are selected from the group consisting of acid-functional monomers, hydroxyl functional monomers, nitrogen-containing monomers, and combinations thereof.

19. The film of claim 1 wherein the film comprises 10 to 25 wt.-% polyvinyl acetal polymer.

20. The film of claim 1 wherein the film comprises 10 to 20 wt.-% polyvinyl acetal polymer.